United States Patent
Kubota et al.

(10) Patent No.: US 11,024,469 B2
(45) Date of Patent: *Jun. 1, 2021

(54) ELECTRODE, METHOD FOR PRODUCING SAID ELECTRODE, ELECTRICITY STORAGE DEVICE PROVIDED WITH SAID ELECTRODE, AND CONDUCTIVE CARBON MIXTURE FOR ELECTRICITY STORAGE DEVICE ELECTRODE

(71) Applicant: NIPPON CHEMI-CON CORPORATION, Tokyo (JP)

(72) Inventors: Satoshi Kubota, Tokyo (JP); Yoshihiro Minato, Tokyo (JP); Shuichi Ishimoto, Tokyo (JP); Kenji Tamamitsu, Tokyo (JP); Masaki Koike, Tokyo (JP); Noriyuki Miyamoto, Tokyo (JP); Masashi Otsuka, Tokyo (JP); Sekihiro Takeda, Tokyo (JP); Katsuhiko Naoi, Fuchu (JP); Wako Naoi, Kunitachi (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 16/401,489

(22) Filed: May 2, 2019

(65) Prior Publication Data

US 2019/0259545 A1 Aug. 22, 2019

Related U.S. Application Data

(62) Division of application No. 15/312,413, filed as application No. PCT/JP2015/064213 on May 18, 2015, now Pat. No. 10,332,692.

(30) Foreign Application Priority Data

May 19, 2014 (JP) .............................. JP2014-103830
Nov. 7, 2014 (JP) .............................. JP2014-226992
Feb. 25, 2015 (JP) .............................. JP2015-035785

(51) Int. Cl.
*H01M 4/04* (2006.01)
*H01M 4/13* (2010.01)
(Continued)

(52) U.S. Cl.
CPC ............. *H01G 11/38* (2013.01); *H01G 11/24* (2013.01); *H01G 11/26* (2013.01); *H01G 11/32* (2013.01);
(Continued)

(58) Field of Classification Search
CPC ........ H01G 11/24; H01G 11/26; H01G 11/32; H01G 11/38; H01G 11/86; H01M 4/0404;
(Continued)

(56) References Cited

U.S. PATENT DOCUMENTS

2012/0156560 A1 6/2012 Hong et al.
2015/0207144 A1 7/2015 Naoi et al.

FOREIGN PATENT DOCUMENTS

JP 11-283623 A 10/1999
JP 2004-134304 A 4/2004
(Continued)

OTHER PUBLICATIONS

International Search Report (PCT/ISA/210) issued in PCT/JP2015/064213, dated Aug. 4, 2015.
(Continued)

*Primary Examiner* — Brittany L Raymond
(74) *Attorney, Agent, or Firm* — Birch, Stewart, Kolasch & Birch, LLP

(57) ABSTRACT

Provided is an electrode which gives an electric storage device that has high energy density and good cycle life. This electrode for an electric storage device is characterized by having an active material layer that contains: an electrode
(Continued)

active material particle; and a paste-like conductive carbon that is derived from an oxidized carbon obtained by giving an oxidizing treatment to a carbon raw material with an inner vacancy and covers a surface of the electrode active material particle. The paste-like conductive carbon derived from the oxidized carbon is densely filled not only into a gap that is formed between the electrode active material particles adjacent to each other but also into a pore that exists on the surface of the active material particle, so that the electrode density is increased, thereby improving the energy density of the electric storage device. In addition, since the paste-like conductive carbon suppresses dissolution of the active material, the cycle characteristics of the electric storage device are improved.

20 Claims, 13 Drawing Sheets

(51) Int. Cl.
H01M 4/139 (2010.01)
H01M 4/36 (2006.01)
H01M 4/62 (2006.01)
H01M 10/052 (2010.01)
H01G 11/24 (2013.01)
H01G 11/26 (2013.01)
H01G 11/32 (2013.01)
H01G 11/38 (2013.01)
H01G 11/86 (2013.01)
H01M 4/136 (2010.01)
H01M 4/58 (2010.01)

(52) U.S. Cl.
CPC ............ *H01G 11/86* (2013.01); *H01M 4/043* (2013.01); *H01M 4/0404* (2013.01); *H01M 4/13* (2013.01); *H01M 4/139* (2013.01); *H01M 4/366* (2013.01); *H01M 4/625* (2013.01); *H01M 10/052* (2013.01); *H01M 4/136* (2013.01); *H01M 4/5825* (2013.01)

(58) Field of Classification Search
CPC ........ H01M 4/043; H01M 4/13; H01M 4/136; H01M 4/139; H01M 4/366; H01M 4/5825; H01M 4/625; H01M 10/052; Y02E 60/10
See application file for complete search history.

(56) References Cited

FOREIGN PATENT DOCUMENTS

| | | | |
|---|---|---|---|
| JP | 2008-016769 | A | 1/2008 |
| JP | 2009-035598 | A | 2/2009 |
| JP | 2012-528451 | A | 11/2012 |
| JP | 2013-077426 | * | 4/2013 |
| JP | 2013-077426 | A | 4/2013 |
| JP | 2013-077479 | A | 4/2013 |
| JP | 2015-079681 | A | 4/2013 |
| JP | 2014-072090 | A | 4/2014 |

OTHER PUBLICATIONS

Written Opinion (PCT/ISA/237) issued in PCT/JP2015/064213, dated Aug. 4, 2015.

* cited by examiner use of acetylene black use of carbon in Example 1 use of acetylene black use of carbon in Example 1

(A)

(B)

ium composite oxide such as $LiCoO_2$, which act as an
ELECTRODE, METHOD FOR PRODUCING SAID ELECTRODE, ELECTRICITY STORAGE DEVICE PROVIDED WITH SAID ELECTRODE, AND CONDUCTIVE CARBON MIXTURE FOR ELECTRICITY STORAGE DEVICE ELECTRODE

CROSS-REFERENCE TO RELATED APPLICATION

This application is a Divisional application of co-pending application Ser. No. 15/312,413, filed on Nov. 18, 2016, which is the National Phase under 35 U.S.C. § 371 of International Application No. PCT/JP2015/064213, filed on May 18, 2015, which claims the benefit under 35 U.S.C. § 119(a) to Patent Application No. 2014-103830, filed in Japan on May 19, 2014, Patent Application No. 2014-226992, filed in Japan on Nov. 7, 2014, and Patent Application No. 2015-035785, filed in Japan on Feb. 25, 2015, all of which are hereby expressly incorporated by reference into the present application.

TECHNICAL FIELD

The present invention relates to an electrode that leads to an electric storage device with a high energy density and excellent cycle life. This invention also relates to a method for producing this electrode and for producing an electric storage device provided with this electrode. The present invention further relates to a conductive carbon mixture that is used for producing the electrode of an electric storage device.

THE RELATED ART

An electric storage device such as a secondary battery, an electric double layer capacitor, a redox capacitor and a hybrid capacitor is a device that is under consideration for wider application as a battery for an information device including a cellphone and a notebook-sized personal computer, for a motor drive power supply of a low-emission vehicle such as an electric vehicle and a hybrid vehicle, and for an energy recovery system, etc. In these devices, improvements in energy density and cycle life are desired to meet the requirements of higher performance and downsizing.

In these electric storage devices, an electrode active material that realizes its capacity by a faradaic reaction involving the transfer of an electron with an ion in an electrolyte (including an electrolytic solution) or by a non-faradaic reaction not involving the transfer of an electron is used for energy storage. Further, this active material is generally used in the form of a composite material with an electroconductive agent. As the electroconductive agent, conductive carbon such as carbon black, natural graphite, artificial graphite, and carbon nanotube is generally used. This conductive carbon, used concurrently with a low conductive active material, serves to add conductivity to the composite material, and furthermore, acts as a matrix to absorb the volume change in accordance with the reaction of the active material. Also, it serves to ensure an electron conducting path when the active material is mechanically damaged.

The composite material of the active material and the conductive carbon is generally manufactured by a method of mixing particles of the active material and the conductive carbon. The conductive carbon does not make a significant contribution to the improvement of the energy density of an electric storage device, so the quantity of the conductive carbon per unit volume needs to be decreased and that of the active material needs to be increased to obtain an electric storage device with a high energy density. Therefore, consideration is given to a method to decrease the distance between the particles of the active material to increase the quantity of the active material per unit volume by improving the dispersibility of the conductive carbon or by reducing the structure of the conductive carbon.

For example, Patent Document 1 (JP 2004-134304 A) discloses a nonaqueous secondary battery that is equipped with a positive electrode that contains a small-sized carbon material having an average primary particle diameter of 10 to 100 nm (in its example, acetylene black) and that has a degree of blackness of 1.20 or more. A coating material used to form the positive electrode is obtained either by dispersing a mixture of an active material for a positive electrode, the abovementioned carbon material, a binder and a solvent by a high shear dispersing machine such as a high speed rotational homogenizer dispersing machine or a planetary mixer with three or more rotary axes, or by adding a dispersion body, in which a mixture of the abovementioned carbon material, a binder and a solvent are dispersed by a high shear dispersing machine, into a paste in which a mixture of the active material for a positive electrode, a binder and a solvent are dispersed, and further dispersing. By using the device that has a high shearing force, the carbon material, which is hard to disperse because of its small particle size, becomes evenly dispersed.

Also, Patent Document 2 (JP 2009-35598 A) discloses an electroconductive agent for an electrode for a nonaqueous secondary battery that consists of acetylene black whose BET-specific surface area is 30 to 90 $m^2/g$, dibutylphthalate (DBP) oil absorption quantity is 50 to 120 mL/100 g, and pH is 9 or more. The electrode for the secondary battery is formed by dispersing a mixture of this acetylene black and an active material in a fluid containing a binder to prepare slurry, and applying this slurry on a current collector and drying it. Since the acetylene black with the abovementioned characteristics has a smaller structure compared with Ketjen Black or other conventional acetylene blacks, the bulk density of a mixture of the acetylene black and the active material is improved and the battery capacity is improved.

Moreover, it is also considered that an even distribution state of an active material and a conductive carbon is created by covering a part or all of the surface of the particles of the active material so that the conductive property among the active materials is increased and degradation of the cycle life is prevented. For example, Patent Document 3 (JP H11-283623 A) discloses a method in which base particles of a lithium composite oxide such as $LiCoO_2$, which act as an active material, and sub-particles of a carbon material such as acetylene black, which act as a conductive agent, are blended while compressive and shearing actions are applied so that a part or all of the surface of the base particles of the composite oxide is covered with the sub-particles of the carbon material. Patent document 3 also discloses that the composite material obtained by this method is used for a positive electrode of a nonaqueous secondary battery.

PRIOR ARTS DOCUMENTS

Patent Documents

Patent Document 1: JP 2004-134304 A
Patent Document 2: JP 2009-35598 A

Patent Document 3: JP H11-283623 A

SUMMARY OF THE INVENTION

Problems to be Solved by the Invention

Further improvement of an electric storage device in terms of energy density is always desired. However, the inventors have examined the prior arts and found that even by the methods disclosed in Patent Documents 1 and 2, it is difficult to enable conductive carbon to infiltrate efficiently between particles of an active material, and therefore, it is difficult to shorten the distance between the active material particles and increase the amount of the active material per unit volume. Therefore, the inventors have found that there is a limitation to the improvement of the energy density with a positive electrode and/or a negative electrode using the composite material of particles of an active material and conductive carbon. Also, there was a limit to the increase in energy density that could be obtained even by a method of using carbon particles to cover the surface of particles of an active material as shown in Patent Document 3, and a satisfactory cycle life could not be obtained because of reasons such as the dissolution of active materials into an electrolytic solution of a nonaqueous secondary battery.

Therefore, the objective of the present invention is to provide an electrode that leads to an electric storage device with a high energy density and excellent cycle life.

Means for Solving Problems

After a keen examination, the inventors have found that the abovementioned purpose is achieved by composing an electrode of an electric storage device by using an electrode material comprising an oxidized carbon, which is obtained by giving a strong oxidizing treatment to a carbon raw material with an inner vacancy, and particles of an active material.

Therefore, the present invention, first of all, relates to an electrode for an electric storage device having an active material layer comprising:

an electrode active material particle; and a paste-like conductive carbon that is derived from an oxidized carbon obtained by giving an oxidizing treatment to a carbon raw material with an inner vacancy and covers a surface of the electrode active material particle.

The inner vacancy includes a pore in porous carbon powder as well as a hollow of Ketjen Black, an internal or interstitial pore of a carbon nanofiber or a carbon nanotube. The word "paste-like" refers to a condition in which the grain boundary of carbon primary particles is not observed and non-particulate amorphous carbons are connected with each other in an SEM image at a magnification of 25,000.

The oxidized carbon obtained by giving an oxidizing treatment to a carbon raw material with an inner vacancy is easily attachable to the surface of the particles of the active material. Moreover, the oxidized carbon obtained by giving a strong oxidizing treatment is compressed integrally and spreads in a paste-like manner when pressure is applied to it, and is hard to separate. Therefore, when the oxidized carbon obtained by giving a strong oxidizing treatment and the particles of the active material are blended to obtain an electrode material for an electrode of an electric storage device, the oxidized carbon is attached to and covers the surface of the particles of the active material in the process of blending and the dispersity of the particles of the active material is improved. Also, by the pressure applied to the oxidized carbon in the process of blending, at least part of the oxidized carbon spreads in a paste-like manner and the surface of the particles of the active material becomes partially covered. Moreover, when an active material layer is formed with this electrode material on a current collector of an electrode and pressure is applied to the active material layer, the oxidized carbon, at least part of which is gelatinized, further spreads and has become dense while covering the surface of the particles of the active material, the particles of the active material approach each other, and accordingly the oxidized carbon which is gelatinized is pushed out not only into gaps that are formed between the active material particles adjacent to each other, but also into pores that exist on the surface of the particles of the active material (including gaps between primary particles that are found in secondary particles) and densely fills the gaps and pores while covering the surface of the particles of the active material (see FIG. 2). Therefore, the amount of the active material per unit volume in the electrode is increased and electrode density is increased. Moreover, the paste-like oxidized carbon that is densely filled has sufficient conductivity to serve as a conductive agent. The electrode of the present invention may comprise the oxidized carbon which is not gelatinized.

In a preferred embodiment of the electrode of the present invention, the paste-like conductive carbon that is derived from the oxidized carbon also exists inside a gap that is formed between the electrode active material particles adjacent to each other and/or a pore that exists on the surface of the electrode active material particle, the gap and the pore having a width of 50 nm or less. Therefore, the coverage of the surface of the particles of the active material by the paste-like conductive carbon is improved, the conductive property of the entire active material layer is improved, and the electrode density is also improved. The term "the width of the gap formed between the electrode active material particles adjacent to each other" means the shortest distance of the distances between the adjacent particles of the electrode active material and the term "the width of the pore that exists on the surface of the electrode active material" means the shortest distance of the distances between the points at the opposite ends of the pore.

It has been found that, although the electrode of the present invention has the active material layer comprising the densely-filled paste-like conductive carbon, the impregnation of an electrolytic solution to the electrode in an electric storage device is not inhibited. It has also been found by measuring the pore distribution of the active material layer of the electrode by a mercury intrusion method that the active material layer has pores with a diameter of 5 to 40 nm in a preferred embodiment of the electrode of the present invention. These pores are considered to be mostly the pores in the paste-like conductive carbon that is derived from an oxidized carbon and has become dense. These pores are so large that the electrolytic solution in the electric storage device passes through the paste-like conductive carbon and reaches the particles of the active material. Therefore, the paste-like conductive carbon in the electrode has a sufficient conductive property and does not inhibit the impregnation of the electrolytic solution in the electric storage device. As a result, the energy density of the electric storage device is improved.

Moreover, it has been found that, probably because the surface of the particles of the active material is covered by the dense, paste-like conductive carbon up to the inner side of the pores that exist on the surface of the particles of the active material in the active material layer of the electrode of the present invention, dissolution of the active material in the electrolytic solution is inhibited and the cycle characteristic of the electric storage device is improved, although the impregnation of the electrolytic solution to the electrode in the electric storage device is not inhibited.

It is preferable that the oxidized carbon that leads to the abovementioned past-like conductive carbon comprises a hydrophilic part and that the contained amount of the hydrophilic part is 10% by mass or more of the entire oxidized carbon. The "hydrophilic part" of carbon means the following: 0.1 g of carbon is added to 20 ml of an ammonia aqueous solution with pH 11, ultrasonic irradiation is applied for 1 minute, and a fluid obtained is left for 5 hours to precipitate its solid phase part. The part that does not precipitate and is dispersed in the ammonia aqueous solution with pH 11 is the "hydrophilic part." Also, the contained amount of the hydrophilic part in the entire carbon can be calculated by the following method: After the precipitation of the solid phase part, the supernatant fluid is removed, the remaining part is dried, and the weight of the solid object after drying is measured. The weight calculated by subtracting the weight of the solid object after drying from the weight of the initial carbon (0.1 g) is the weight of the "hydrophilic part," which is dispersed in the ammonia aqueous solution with pH 11. The weight ratio of the weight of the "hydrophilic part" against the weight of the initial carbon (0.1 g) is the contained amount of the "hydrophilic part" in the carbon.

The ratio of the hydrophilic part in conductive carbon such as carbon black, natural graphite and carbon nanotube, which is used as a conductive agent in an electrode of a conventional electric storage device, is 5% by mass or less of the entire conductive carbon. However, by using a carbon having an inner vacancy as a raw material and giving an oxidizing treatment to this raw material, the surface of its particles is oxidized and a hydroxy group, a carboxy group and an ether bond are introduced into the carbon, and a conjugated double bond of the carbon is oxidized so that a carbon single bond is formed, a carbon-carbon bond is partially severed, and a hydrophilic part is formed on the surface of the particles. Then, as the intensity of the oxidizing treatment is increased, the percentage of the hydrophilic part in the carbon particle is increased and the hydrophilic part accounts for 10% by mass or more of the entire carbon. Moreover, such an oxidized carbon is likely to be compressed integrally and spread in a paste-like manner when pressure is applied to it, cover most or all of the surface of the particles of the active material up to the inside of the pores that exist on the surface of the particles of the active material, and become dense. As a result, an electrode in which 80% or more, preferably 90% or more and especially preferably 95% or more of the surface (outer surface) of the particles of the active material in the active material layer of the electrode contacts the paste-like conductive carbon, which is derived from the oxidized carbon and become dense, can be obtained. The coverage rate of the surface of the particles of the active material by the paste-like conductive carbon is a value calculated by observation of SEM images of the cross-sectional surface of the active material layer at a magnification of 25,000.

In the electrode for an electric storage device of the present invention, it is preferable that the electrode active material particles in the active material layer are composed of fine particles with an average diameter of 0.01 to 2 μm that are operable as a positive electrode active material or a negative electrode active material and gross particles with an average diameter of more than 2 μm and not more than 25 μm that are operable as an active material of the same electrode as the fine particles. The gross particles increase the electrode density on their own and also have an effect of suitably pressing the oxidized carbon at the time of producing an electrode material and producing an electrode, swiftly transforming the oxidized carbon to paste and making it dense, and therefore increasing the electrode density and improving the energy density of the electric storage device. Also, due to the pressure applied to the active material layer in producing the electrode, the fine particles press the oxidized carbon, at least part of which is gelatinized, and are pushed out into the gaps that are formed between the adjacent gross particles together with the paste-like oxidized carbon, so that the electrode density further increases and the energy density of the electric storage device further improves. The average diameter of the active material particles is the 50% radius (median diameter) as in the measurement of particle size distribution obtained by using a light scattering particle size meter.

In the electrode for an electric storage device of the present invention, it is preferable that a different kind of conductive carbon, especially conductive carbon that has a higher electroconductivity than the paste-like conductive carbon that is derived from the oxidized carbon, is further comprised in the active material layer. When pressure is applied to the active material layer when the electrode is produced, this carbon is also covered by the paste-like conductive carbon and densely fills the gaps formed by the adjacent particles of the active material together with the paste-like conductive carbon and the conductivity of the active material layer is improved, so that the energy density of the electric storage device further improves.

In the electrode for an electric storage device of the present invention, it is preferable that the mass ratio of the electrode active material particle and the conductive carbon in the active material layer is within the range of 95:5 to 99:1. If the different conductive carbon is comprised in addition to the paste-like conductive carbon that is derived from the oxidized carbon, it is preferable that the mass ratio of the total amount of these carbons and the electrode active material particle is within the abovementioned range. If the ratio of the conductive carbon is lower than the abovementioned range, the conductive property of the active material layer tends to become insufficient, and the cycle characteristic tends to decrease because the coverage rate of the conductive carbon over the active material particles decreases. If the ratio of the conductive carbon is larger than the abovementioned range, the electrode density tends to decrease and the energy density of the electric storage device tends to decrease.

As mentioned above, the electrode for an electric storage device of the present invention can be suitably produced by a method comprising:

a preparation process of blending the electrode active material particle and the oxidized carbon obtained by giving an oxidizing treatment to a carbon raw material with an inner vacancy so that an electrode material, in which at least part of the oxidized carbon is gelatinized and attached to the surface of the electrode active material particle, is prepared; and a pressure process of forming the active material layer on a current collector with the electrode material and applying pressure to the active material layer.

Therefore, the present invention also relates to the method for producing the electrode.

If a different conductive carbon, especially a conductive carbon that has a higher conductivity than the paste-like conductive carbon derived from the oxidized carbon is comprised in the active material layer, it is preferable that the abovementioned preparation process is conducted by a process comprising:

a step of dry blending the oxidized carbon and the different conductive carbon so that a conductive carbon mixture, in which at least part of the oxidized carbon is gelatinized and is attached to the surface of the different conductive carbon, is obtained; and a step of dry blending or wet blending the conductive carbon mixture and the electrode active material particle so that the oxidized carbon, at least part of which is gelatinized, is also attached to the surface of the electrode active material particle.

Fine carbon particles are poorly compatible with a binder and a solvent. Therefore, when an electrode material in the form of slurry containing a binder and a solvent is prepared, wet blending by using a high shear dispersing device, or a blending method in which the particles of an electrode active material and carbon are dry blended and then a binder and a solvent are added and wet blended, are commonly used as mentioned above in relation to Patent Document 1 and Patent Document 2. However, the abovementioned conductive carbon mixture produces an electrode with a high electrode density and excellent conductive property irrespective of the blending method of the conductive carbon mixture and the particles of the electrode active material. Therefore, the present invention also relates to a conductive carbon mixture for producing an electrode for an electric storage device, in which the conductive carbon mixture comprises: a conductive carbon, at least part of which is gelatinized, which is derived from an oxidized carbon obtained by giving an oxidizing treatment to a carbon raw material with an inner vacancy; and a conductive carbon different from the oxidized carbon, and the conductive carbon, at least part of which is gelatinized, is attached to a surface of the different conductive carbon.

The electrode of the present invention leads to an electric storage device with a high energy density and excellent cycle life. Therefore, the present invention also relates to an electrode device with the abovementioned electrode.

Advantageous Effects of the Invention

In the electrode of the present invention that has an active material layer comprising an electrode active material particle and a paste-like conductive carbon that is derived from an oxidized carbon obtained by giving an oxidizing treatment to a carbon raw material with an inner vacancy and covers a surface of the electrode active material particle, the paste-like conductive carbon that is derived from the oxidized carbon is densely filled not only into the gaps formed between the particles of an active material but also into the inside of the pores that exist on the surface of the particles of the active material, so that the amount of the active material per unit volume in the electrode is increased, and the electrode density is increased. Also, the paste-like conductive carbon that is densely filled has a sufficient conductive property to function as a conductive agent and does not inhibit the impregnation of the electrolytic solution in the electric storage device. Therefore, the energy density of the electric storage device is improved. Also, probably because the surface of the active material particles is covered by the oxidized carbon that spreads in a paste-like manner up to the inside of the pores that exist on the surface of the active material particles in the electrode of the present invention, dissolution of the active material in the electrolytic solution is inhibited and the cycle characteristic of the electric storage device is improved when the electrode of the present invention is used in the electric storage device.

DETAILED DESCRIPTION OF THE INVENTION

Figure 1:
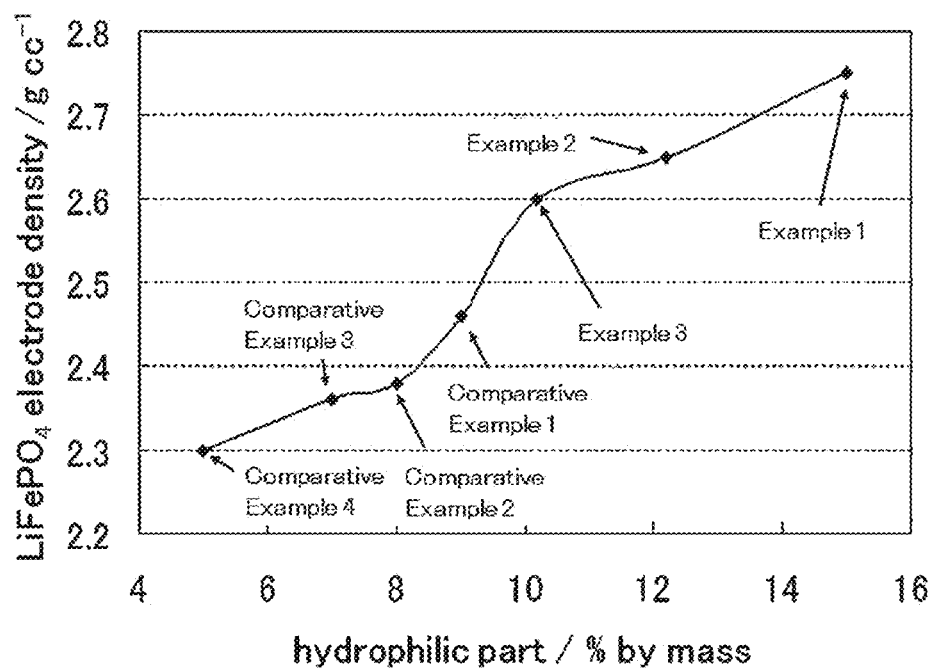
FIG. 1 shows a graph in which the relationship between the contained amount of a hydrophilic part of an oxidized carbon and the electrode density is shown for electrodes of working examples and comparative examples.

An electrode for an electric storage device of the present invention has an active material layer that comprises an electrode active material particle and a paste-like conductive carbon that is derived from an oxidized carbon obtained by giving an oxidizing treatment to a carbon raw material with an inner vacancy and covers a surface of the electrode active material particle. The oxidized carbon before it is gelatinized is described first, and then the electrode of the present invention and an electric storage device provided with the electrode is described.

(1) Oxidized Carbon

In the electrode of the present invention, the oxidized carbon that leads to the paste-like conductive carbon comprised in the active material layer is produced by using as a raw material a carbon with an inner vacancy such as porous carbon powder, Ketjen Black, furnace black with pores, carbon nanofiber and carbon nanotube. It is preferable to use a carbon with an inner vacancy whose specific surface area as measured by the BET method is 300 $m^2/g$ or more as a carbon raw material because the carbon is prone to become an oxidized carbon that is gelatinized by oxidizing treatment. Above all, spherical particles such as Ketjen Black and furnace black with pores are preferable. An oxidized carbon that is gelatinized is hard to be obtained even if a solid carbon is used as a raw material and oxidizing treatment is given.

A heretofore-known oxidizing treatment can be used without any restriction for oxidizing treatment of the carbon raw material with an inner vacancy. For example, the oxidized carbon can be obtained by treating the carbon raw material in a solution of acid or hydrogen peroxide. For the acid, nitric acid, a mixture of nitric acid and sulfuric acid, and hypochlorous acid aqueous solution can be used. Also, the oxidized carbon can be obtained by heating the carbon raw material in an oxygen-containing atmosphere, water vapor or carbon dioxide. Moreover, the oxidized carbon can be obtained by plasma treatment, ultraviolet irradiation, corona discharge treatment, and glow discharge treatment of the carbon raw material in an oxygen-containing atmosphere.

When the oxidizing treatment is applied to the carbon raw material with an inner vacancy, the surface of its particle is oxidized, and a hydroxy group, a carboxy group and an ether bond are introduced into the carbon, and a conjugated double bond of the carbon is oxidized so that a carbon single bond is formed, a carbon-carbon bond is partially severed, and a part having high hydrophilicity is formed on the surface of the particle. The oxidized carbon with such hydrophilic part easily attaches to the surface of the particles of an active material and aggregation of the particles of an active material is effectively inhibited. Then, as the intensity of the oxidizing treatment is increased, the ratio of the hydrophilic part in the carbon particle is increased and the oxidized carbon that is gelatinized in the process of producing an electrode is obtained. It is preferable that the contained amount of the hydrophilic part in the oxidized carbon is 10% by mass or more of the entire oxidized carbon. It is especially preferable that the contained amount of the hydrophilic part in the oxidized carbon is 12% by mass or more and 30% by mass or less of the entire oxidized carbon.

The oxidized carbon having a hydrophilic part that account for 10% by mass or more of the entire oxidized carbon can be suitably obtained by the manufacturing method comprising:

(a) a process in which acidic treatment is given to a carbon raw material with an inner vacancy;
(b) a process in which the product after the acidic treatment and a transition metal compound are mixed;
(c) a process in which the mixture obtained is pulverized to produce a mechanochemical reaction;
(d) a process in which the product after the mechanochemical reaction is heated in a nonoxidizing atmosphere; and
(e) a process in which the aforementioned transition metal compound and/or its reaction product is removed from the product after heating.

In the (a) process, the carbon raw material with an inner vacancy, preferably Ketjen Black, is left immersed in acid. An ultrasonic wave can be irradiated during this immersion. As acid, an acid usually used for an oxidizing treatment of carbon such as nitric acid, a mixture of nitric acid and sulfuric acid, and an aqueous solution of hypochlorous acid can be used. The immersion time depends on the concentration of acid or the quantity of the carbon raw material to be treated, and is usually within the range of 5 minutes to 5 hour. The carbon after acidic treatment is sufficiently washed by water and dried, and then mixed with the transition metal compound in the (b) process.

For the chemical compound of transition metal to be added to the carbon raw material in the (b) process, an inorganic metallic salt of transition metal such as a halide, nitrate, sulfate and carbonate; an organic metallic salt of transition metal such as formate, acetate, oxalate, methoxide, ethoxide and isopropoxide; or a mixture thereof can be used. These chemical compounds can be used alone, or two or more kinds can be used as a mixture. Chemical compounds that contain different transition metals can be mixed in a prescribed amount and used. Also, a chemical compound other than the chemical compound of transition metal, such as an alkali metal compound, can be added concurrently unless it has an adverse effect on the reaction. Since the oxidized carbon is mixed with particles of an active material and used in manufacturing an electrode of an electric storage device, it is preferable that a chemical compound of an element constituting the active material is added to the carbon raw material so that adulteration of an element that can serve as impurities against the active material can be prevented.

In the (c) process, the mixture obtained in the (b) process is pulverized and a mechanochemical reaction is produced. Examples of a powdering machine for this reaction are a mashing machine, stone mill, ball mill, bead mill, rod mill, roller mill, agitation mill, planetary mill, vibrating mill, hybridizer, mechanochemical composite device and jet mill. Milling time depends on the powdering machine used or the quantity of the carbon to be treated and has no strict restrictions, but is generally within the range of 5 minutes to 3 hours. The (d) process is conducted in a nonoxidizing atmosphere such as a nitrogen atmosphere and an argon atmosphere. The temperature and time of heating is chosen in accordance with the chemical compound of transition metal used. In the subsequent (e) process, the oxidized carbon having a hydrophilic part that account for 10% by mass or more of the entire oxidized carbon can be obtained by removing the chemical compound of transition metal and/or its reaction product from the product that has been heated by means of acid dissolution etc., then sufficiently washing and drying.

In the manufacturing method, the chemical compound of transition metal promotes the oxidation of the carbon raw material by the mechanochemical reaction in the (c) process, and the oxidation of the carbon raw material rapidly proceeds. By this oxidation, the oxidized carbon that comprises a hydrophilic part, which is 10% by mass or more of the entire oxidized carbon, can be obtained.

The oxidized carbon having a hydrophilic part that accounts for 10% by mass or more of the entire oxidized carbon can be obtained by giving a strong oxidizing treatment to a carbon raw material with an inner vacancy, and it is also possible to facilitate the oxidation of the carbon raw material with an inner vacancy by a method other than the abovementioned method of production.

The oxidized carbon obtained is used for an electrode of an electric storage device such as a secondary battery, an electric double layer capacitor, a redox capacitor and a hybrid capacitor in an embodiment in which the oxidized carbon is mixed with an electrode active material that realizes its capacity by a faradaic reaction that involves the transfer of an electron between an ion in an electrolyte of an electric storage device or a nonfaradaic reaction that does not involve the transfer of an electron.

(2) Electrode

The electrode for an electric storage device of the present invention can be suitably obtained by a method of production that comprises:

(A) a preparation process of blending an electrode active material particle and the oxidized carbon so that an electrode material, in which at least part of the oxidized carbon is gelatinized and attached to the surface of the electrode active material particle, is prepared; and (B) a pressure process of forming an active material layer on a current collector with the electrode material and applying pressure to the active material layer.

In process (A), aggregation of the active material particles can be inhibited because the oxidized carbon is attached to the surface of the active material particles and covers the surface. Also, by the pressure applied to the oxidized carbon in the process of blending, at least part of the oxidized carbon spreads in a paste-like manner and the surface of the active material particles is partially covered.

As the electrode active material used in process (A), an active material that is used in a conventional electric storage device as an active material for a positive electrode or an active material for a negative electrode can be used without any specific restrictions. The active material can be a single chemical compound or a mixture of two or more kinds of chemical compound.

Examples of a positive electrode active material for a secondary battery are, among all, $LiMO_2$ having a laminar rock salt structure, laminar $Li_2MnO_3$-$LiMO_2$ solid solution, and spinel $LiM_2O_4$ (M in the formula signifies Mn, Fe, Co, Ni or a combination thereof). Specific examples of these are $LiCoO_2$, $LiNiO_2$, $LiNi_{4/5}Co_{1/5}O_2$, $LiNi_{1/3}Co_{1/3}Mn_{1/3}O_2$, $LiNi_{1/2}Mn_{1/2}O_2$, $LiFeO_2$, $LiMnO_2$, $Li_2MnO_3$—$LiCoO_2$, $Li_2MnO_3$—$LiNiO_2$, $Li_2MnO_3$—$LiNi_{1/3}Co_{1/3}Mn_{1/3}O_2$, $Li_2MnO_3$—$LiNi_{1/2}Mn_{1/2}O_2$, $Li_2MnO_3$—$LiNi_{1/2}Mn_{1/2}O_2$—$LiNi_{1/3}Co_{1/3}Mn_{1/3}O_2$, $LiMn_2O_4$ and $LiMn_{3/2}Ni_{1/2}O_4$. Other examples include sulfur and a sulfide such as $Li_2S$, $TiS_2$, $MoS_2$, $FeS_2$, $VS_2$ and $Cr_{1/2}V_{1/2}S_2$, a selenide such as $NbSe_3$, $VSe_2$ and $NbSe_3$, an oxide such as $Cr_2O_5$, $Cr_3O_8$, $VO_2$, $V_3O_8$, $V_2O_5$ and $V_6O_{13}$ as well as a complex oxide such as $LiNi_{0.8}Co_{0.15}Al_{0.05}O_2$, $LiVOPO_4$, $LiV_3O_5$, $LiV_3O_8$, $MoV_2O_8$, $Li_2FeSiO_4$, $Li_2MnSiO_4$, $LiFePO_4$, $LiFe_{1/2}Mn_{1/2}PO_4$, $LiMnPO_4$ and $Li_3V_2(PO_4)_3$.

Examples of a negative electrode active material for a secondary battery are an oxide such as $Fe_2O_3$, $MnO$, $MnO_2$, $Mn_2O_3$, $Mn_3O_4$, $CoO$, $Co_3O_4$, $NiO$, $Ni_2O_3$, $TiO$, $TiO_2$, $SnO$, $SnO_2$, $SiO_2$, $RuO_2$, $WO$, $WO_2$ and $ZnO$, metal such as Sn, Si, Al and Zn, a complex oxide such as $LiVO_2$, $Li_3VO_4$ and $Li_4T_{15}O_{12}$, and a nitride such as $Li_{2.6}Co_{0.4}N$, $Ge_3N_4$, $Zn_3N_2$ and $Cu_3N$.

As an active material in a polarizable electrode of an electric double layer capacitor, a carbon material with a large specific surface area such as activated carbon, carbon nanofiber, carbon nanotube, phenol resin carbide, polyvinylidene chloride carbide and microcrystal carbon is exemplified. In a hybrid capacitor, a positive electrode active material exemplified for a secondary battery can be used as a positive electrode. In this case, a negative electrode is composed of a polarizable electrode using activated carbon etc. Also, a negative electrode active material exemplified for a secondary battery can be used as a negative electrode. In this case, a positive electrode is composed of a polarizable electrode using activated carbon etc. As a positive electrode active material of a redox capacitor, a metal oxide such as $RuO_2$, $MnO_2$ and $NiO$ is exemplified, and a negative electrode is composed of an active material such as $RuO_2$ and a polarizable material such as activated carbon.

There is no restriction as to the shape and particle diameter of the electrode active material particles that are mixed with the oxidized carbon in process (A), but it is preferable that the average particle diameter of the particles of the active material is more than 2 μm and not more than 25 μm. The particles of the active material that have such a relatively large diameter improve electrode density on their own, and in the process of blending with the oxidized carbon, gelatinization of the oxidized carbon is promoted by the compressing strength of the particles. Also, in process (B) shown below, during the step of applying pressure to the active material layer on the current collector, the particles of the active material that have such a relatively large particle diameter further press the oxidized carbon, at least a part of which is gelatinized, and make the oxidized carbon further spread in a paste-like manner, and make the carbon denser. As a result, the electrode density further increases and the energy density of an electric storage device further improves.

Also, it is preferable that the active material particles are composed of fine particles with an average diameter of 0.01 to 2 μm and gross particles with an average diameter of more than 2 μm and not more than 25 μm that are operable as an active material of the same electrode as the fine particles. It is said that particles with a small particle diameter easily aggregate, but the oxidized carbon is attached to and covers the surface not only of the gross particles but also of the fine particles, so that aggregation of the particles of the active material can be inhibited, and the blending state of the particles of the active material and the oxidized carbon can be uniformalized. Also, as mentioned above, the gross particles promote gelatinization and densification of the oxidized carbon, increase the electrode density, and improve the energy density of the electric storage device. Further, in process (B), during the step of applying pressure to the active material layer on the current collector, the fine particles press the oxidized carbon, at least part of which is gelatinized, and are pushed out into and fill the gaps that are formed between the adjacent gross particles together with the paste-like oxidized carbon, so that the electrode density further increases and the energy density of the electric storage device further improves. It is preferable to select gross particles and fine particles within the range of 80:20 to 95:5 by mass, and it is more preferable to select them within the range of 90:10 to 95:5 by mass.

The mass ratio of the electrode active material particles and the oxidized carbon that are used in process (A) is preferably within the range of 90:10 to 99.5:0.5 and more preferably within the range of 95:5 to 99:1 in order to obtain an electric storage device with a high energy density. If the ratio of the oxidized carbon is lower than the abovementioned range, the conductive property of the active material layer tends to become insufficient, and the cycle characteristic tends to decrease because the coverage rate of the oxidized carbon over the active material particles decreases. Also, if the ratio of the oxidized carbon is larger than the abovementioned range, the electrode density tends to decrease and the energy density of the electric storage device tends to decrease.

In process (A), in addition to the electrode active material particles and the oxidized carbon, a conductive carbon different from the oxidized carbon, a binder and a solvent for blending can be used as needed, in order to produce an electrode material, in which at least part of the oxidized carbon is gelatinized and attached to the surface of the electrode active material particles. By using a solvent, an electrode material in the form of slurry can be obtained.

For the different conductive carbon, carbon black such as Ketjen Black, furnace black, acetylene black and channel black, fullerene, carbon nanotube, carbon nanofiber, graphene, amorphous carbon, carbon fiber, natural graphite, artificial graphite, graphitized Ketjen Black, mesoporous carbon, and vapor grown carbon fiber etc., which are used in an electrode in a conventional electric storage device, can be used. The usage of a conductive carbon that has a higher conductive property than the paste-like conductive carbon derived from the oxidized carbon, and especially the usage of acetylene black, is preferable. Aggregation of the different conductive carbon can be inhibited because the oxidized carbon is attached to and covers not only the surface of the particles of the active material, but also the surface of the different conductive carbon. Moreover, in process (B) shown below, the energy density of the electric storage device further improves because the different conductive carbon are pushed out into and fill the gaps that are formed between adjacent particles together with the paste-like oxidized carbon during the step of applying pressure to the active material layer on the current collector and the conductive property of the whole electrode is improved. The ratio of the oxidized carbon and the different conductive carbon is preferably within the range of 3:1 to 1:3 by mass and more preferably within the range of 2.5:1.5 to 1.5:2.5 by mass. Moreover, in cases where the different conductive carbon is used, the ratio of the electrode active material particles and the total amount of the different conductive carbon and the oxidized carbon is preferably within the range of 10:90 to 0.5:99.5 by mass and more preferably within the range of 5:95 to 1:99 by mass.

As the binder, a heretofore known binder such as polytetrafluoroethylene, polyvinylidene fluoride, tetrafluoroethylene-hexafluoropropylene copolymer, polyvinyl fluoride and carboxymethylcellulose can be used. It is preferable that the amount of the binder used is 1 to 30% by mass of the total amount of the electrode material. If the amount of the binder used is 1% by mass or less, the strength of the active layer is not sufficient, and if the amount of the binder used is 30% by mass or more, drawbacks such as a decrease in the discharge capacity of an electrode or excessive internal resistance arise. As the solvent for blending, a solvent such as N-methyl pyrrolidone that does not adversely affect the other component elements in the electrode material can be used without any restriction. There is no restriction as to the amount of the solvent provided each component element within the mixture is evenly blended. The binder can be used under the condition of being dissolved in the solvent.

In process (A), there is no restriction as to the method and order of blending the electrode active material particles and the oxidized carbon, and if needed, the conductive carbon different from the oxidized carbon, the binder and the solvent for blending.

However, if the conductive carbon different from the oxidized carbon is not used, it is preferable to dry blend the particles of the electrode active material and the oxidized carbon in process (A). By sufficiently kneading the obtained product with a binder as necessary and a solvent, an electrode material in the form of slurry can be obtained. For dry blending, a mashing machine, stone mill, ball mill, bead mill, rod mill, roller mill, agitation mill, planetary mill, vibration mill, hybridizer, mechanochemical composite device and jet mill can be used. Especially, it is preferable to give a mechanochemical treatment to the active material particles and the oxidized carbon because the coatability and the evenness of the coverage of the active material particles by the oxidized carbon are improved. The time for dry blending can vary according to the total amount of the active material particles and the oxidized carbon to be blended and the blending device used, but generally it is within the range of 1 to 30 minutes. Also, there is no special restriction as to the method of kneading with the binder and the solvent, which can be done manually with a mortar or which can be done with a heretofore known kneading device such as a stirring machine or a homogenizer. If each component element in the electrode material is evenly blended, the mixing time can be short.

If the active material particles are composed of fine particles and gross particles, and the different conductive carbon is not used, all of the fine particles, the gross particles and the oxidized carbon can be introduced into a blending device and dry blended in process (A). By sufficiently kneading the product obtained by dry blending together with a binder as needed and a solvent, an electrode material in the form of slurry can be obtained. However, it is preferable to conduct the dry blending in the following two steps:

(A1) obtaining a preliminary mixture by dry blending the oxidized carbon and the fine particles, and (A2) dry blending the preliminary mixture obtained and the gross particles.

Conducting the dry blending by step (A1) and step (A2) is preferable because an electrode material, in which the gross particles and fine particles that are covered by the oxidized carbon are evenly blended in a highly dispersed manner, can be obtained. Moreover, because the product obtained in step (A2) is compatible with a binder and a solvent, an electrode material in the form of slurry, in which each component element is evenly blended, can be easily obtained. The ratio of the fine particles and the oxidized carbon in the step of obtaining the preliminary mixture is preferably within the range of 70:30 to 90:10 by mass and more preferably within the range of 75:25 to 85:15.

If the conductive carbon different from the oxidized carbon is used, all of the active material particles, the oxidized carbon and the different conductive carbon can be introduced into a blending device and dry blended in process (A). By sufficiently kneading the product obtained by dry blending with a binder as needed and a solvent, an electrode material in the form of slurry can be obtained. However, it is preferable to conduct the dry blending in the following two steps:

(AA1) dry blending the oxidized carbon and the different conductive carbon, and (AA2) dry blending the mixture obtained in step (AA1) and the active material particles.

The mixture obtained in step (AA1) is a "conductive carbon mixture." In this step, the oxidized carbon is attached to the surface of the different conductive carbon, the gelatinization of the oxidized carbon partially proceeds, and the conductive carbon mixture, in which the oxidized carbon, at least part of which is gelatinized, is attached to the surface of the different conductive carbon, is obtained. Then, in step (AA2), the oxidized carbon, at least part of which is gelatinized, is also attached to the surface of the electrode active material particles, and an electrode, in which the electrode active material particles and the different conductive carbon which are covered with the oxidized carbon are evenly blended in a highly dispersed manner, is obtained. Also, because this conductive carbon mixture is compatible with a binder and a solvent, one of the following steps can be conducted instead of step (AA2) and the subsequent kneading with a binder and a solvent in order to obtain an electrode material in the form of slurry:

(aa1) wet blending the conductive carbon mixture, the active material particles, the binder and the solvent, or
(aa2) wet blending the conductive carbon mixture, the binder and the solvent, further adding the active material particles and wet blending, or
(aa3) wet blending the conductive carbon mixture, the active material particles and the solvent, further adding the binder and wet blending.

Fine carbon particles are said to be poorly compatible with a binder and a solvent, but by using the conductive carbon mixture, an electrode material in which each component is evenly blended can be easily obtained regardless of the blending method of this mixture and the electrode active material particles. Also, various production lines can be established if the conductive carbon mixture is prepared previously because the subsequent blending of the active material particles and the binder can be conducted by both wet blending and dry blending.

Also, if the active material particles are composed of fine particles and gross particles, and the different conductive carbon is used, all of the fine particles, the gross particles, the oxidized carbon and the different conductive carbon can be introduced into a blending device and dry blended in process (A). An electrode material in the form of slurry can be obtained by sufficiently kneading the product obtained by dry blending with a binder as needed and a solvent. However, it is preferable to conduct the dry blending in the following steps:

(AB1) dry blending the oxidized carbon and the different conductive carbon,
(AB2) dry blending the mixture obtained in step (AB1) and the fine particles, and
(AB3) dry blending the mixture obtained in step (AB2) and the gross particles.

It is also preferable to conduct the dry blending in the following steps:
(AC1) dry blending the oxidized carbon and the fine particles,
(AC2) dry blending the mixture obtained in step (AC1) and the different conductive carbon, and
(AC3) dry blending the mixture obtained in step (AC2) and the gross particles.

In these methods, at least in one of steps (AB1), (AB2), (AC1) and (AC2), the oxidized carbon is attached to the surface of the fine particles or the different conductive carbon, and the gelatinization of the oxidized carbon partially proceeds, and therefore a mixture in which the oxidized carbon, the gross particles, the fine particles and the different carbon are evenly blended in a highly dispersed manner can be obtained. Also, because the conductive carbon mixture obtained in step (AB1) is compatible with a binder and a solvent as mentioned above, one of the following steps can be conducted in order to obtain an electrode material in the form of slurry instead of step (AB2), step (AB3) and the subsequent kneading with a binder and a solvent:

(ab1) wet blending the conductive carbon mixture, the fine particles, the gross particles, the binder and the solvent, or
(ab2) wet blending the conductive carbon mixture, the binder and the solvent, further adding the fine particles and the gross particles and wet blending, or
(ab3) wet blending the conductive carbon mixture, the fine particles, the gross particles and the solvent, further adding the binder and wet blending.

In cases where process (A) is conducted by using these methods, the amount of the different conductive carbon used is chosen so that the ratio of the fine particles and the total amount of the oxidized carbon and the different conductive carbon is within the range of 70:30 to 90:10 by mass and preferably within the range of 75:25 to 85:15 by mass.

In process (B), an active material layer is formed by applying the electrode material obtained in process (A) onto a current collector to constitute a positive electrode or negative electrode of an electric storage device, this active material layer is dried as necessary, pressure is applied to the active material layer by rolling treatment, and an electrode is obtained. The rolling treatment can be given after the electrode material obtained in process (A) has been shaped into a predefined form and press-fitted onto the current collector.

In process (B), as pressure is applied to the active material layer, the oxidized carbon at least part of which is gelatinized further spreads and has become dense while covering the surface of the active material particles, the active material particles approach each other, and accordingly the paste-like oxidized carbon is pushed out not only into the gaps formed between the adjacent particles of the active material, but also into the pores that exist on the surface of the particles of the active material, and densely fills the gaps and pores while covering the surface of the particles of the active material. Therefore, the amount of the active material per unit volume in the electrode is increased and the electrode density is increased. Moreover, the paste-like oxidized carbon that is densely filled has a sufficient conductive property to serve as a conductive agent.

As the current collector for an electrode of an electric storage device, an electroconductive material such as platinum, gold, nickel, aluminum, titanium, steel and carbon can be used. For the form of the current collector, any form such as a film, foil, plate, net, expanded metal, or cylinder can be adopted. To dry the active material layer, the solvent can be removed, if needed, by heating under reduced pressure. The pressure applied to the active material layer by rolling treatment is generally within the range of 50,000 to 1,000,000 N/cm$^2$ and preferably within the range of 100,000 to 500,000 N/cm$^2$. Also, there is no special restriction as to the temperature of the rolling treatment, and the rolling treatment can be given at a normal temperature or under a heating condition.

In a preferred embodiment of the electrode of the present invention, the paste-like conductive carbon in the active material layer also exists inside the gaps formed between the adjacent particles of the electrode active material and/or the pores that exist on the surface of the particles of the electrode active material. Therefore, the coverage of the surface of the particles of the active material by the paste-like conductive carbon is increased, the conductive property of the entire active material layer is improved and the electrode density is also improved. Conductive carbon such as carbon black, natural graphite and carbon nanotube, which are used as a conductive agent in an electrode of a conventional electric storage device, can hardly intrude into gaps or pores of such narrow width.

It has been found that, although the electrode of the present invention has the active material layer comprising the paste-like conductive carbon that is densely filled, impregnation of an electrolytic solution in an electric storage device into the electrode is not inhibited. In a preferred embodiment of the electrode of the present invention, the measurement of pore distribution in the active material layer of the electrode by the mercury intrusion method reveals that the active material layer has pores with a diameter of 5 to 40 nm. These fine pores, which are considered to be mainly pores in the paste-like conductive carbon that is derived from the oxidized carbon and that has become dense, are large enough to allow an electrolytic solution in an electric storage device to pass through the paste-like conductive carbon to the particles of the active material. Therefore, the paste-like conductive carbon in the electrode has a sufficient conductive property and does not inhibit the impregnation of the electrolytic solution in the electric storage device. As a result, the energy density of the electric storage device is improved.

Moreover, it has been found that, probably because the surface of the particles of the active material in the active material layer of the electrode of the present invention is covered by the dense oxidized carbon that spreads in a paste-like manner up to the inside of the pores that exist on the surface of the particles of the active material, dissolution of the active material in the electrolytic solution is inhibited and the cycle characteristic of the electric storage device is improved although the impregnation of the electrolytic solution in the electric storage device into the electrode is not inhibited. In a preferred embodiment of the electrode of the present invention, the amount of dissolution of the active material is decreased by as much as 40% or more compared with when an electrode is composed of a conventional conductive agent such as acetylene black and the particles of the active material. Moreover, because the dissolution of the active material is significantly inhibited, the cycle characteristic of the electric storage device is significantly improved.

Especially, the oxidized carbon with a hydrophilic part that account for 10% by mass or more of the whole oxidized carbon is likely to be integrally compressed and spread in a paste-like manner when pressure is applied, cover most or all of the surface of the particles of the active material up to the inside of the pores that exist on the surface of the particles of the active material, and become dense. As a result, an electrode, in which 80% or more, preferably 90% or more and especially preferably 95% or more of the surface of the particles of the active material in the active material layer of the electrode contacts the paste-like conductive carbon that is derived from the oxidized carbon and has become dense, is obtained.

(3) Electric Storage Device

The electrode of the present invention is used for an electrode of an electric storage device such as a secondary battery, an electric double layer capacitor, a redox capacitor and a hybrid capacitor. The electric storage device comprises a pair of electrodes (positive electrode and negative electrode) and an electrolyte that is placed therebetween as essential components. At least either of the positive electrode or the negative electrode is produced by the method of producing in the present invention.

The electrolyte that is placed between a positive electrode and a negative electrode in an electric storage device can be an electrolytic solution that is held by a separator, a solid electrolyte, or a gel electrolyte, that is, an electrolyte that is used in a conventional electric storage device can be used without any restrictions. Representative electrolytes are as follows. For a lithium ion secondary battery, an electrolytic solution in which a lithium salt such as $LiPF_6$, $LiBF_4$, $LiCF_3SO_3$ and $LiN(CF_3SO_2)_2$ is dissolved in a solvent such as ethylene carbonate, propylene carbonate, butylene carbonate and dimethylcarbonate can be used and held by a separator such as polyolefin fiber nonwoven fabric and glass fiber nonwoven fabric. Further, an inorganic solid electrolyte such as $Li_5La_3Nb_2O_{12}$, $Li_{1.5}Al_{0.5}Ti_{1.5}(PO_4)_3$, $Li_7La_3Zr_2O_{12}$ and $Li_7P_3S_{11}$, an organic solid electrolyte that is composed of a complex of a lithium salt and a macromolecule compound such as polyethylene oxide, polymethacrylate and polyacrylate, and a gel electrolyte in which an electrolytic solution is absorbed into polyvinylidene fluoride and polyacrylonitrile etc. are also used. For an electric double layer capacitor and a redox capacitor, an electrolytic solution in which a quaternary ammonium salt such as $(C_2H_5)_4NBF_4$ is dissolved in a solvent such as acrylonitrile and propylene carbonate is used. For a hybrid capacitor, an electrolytic solution in which a lithium salt is dissolved in propylene carbonate etc. or an electrolytic solution in which a quaternary ammonium salt is dissolved into propylene carbonate etc. is used.

However, if a solid electrolyte or a gel-like electrolyte is used as the electrolyte between a positive electrode and a negative electrode, an electrode material is prepared by adding a solid electrolyte to each of the abovementioned component elements in the abovementioned process (A) for the purpose of securing an ion conduction path in the active material layer.

EXAMPLES

The present invention is explained in the following examples, though the present invention is not limited to the following examples.

(1) Production of Oxidized Carbon and Electrode

Example 1

Ketjen Black (trade name: EC300J, manufacturer: Ketjen Black International Co., the BET specific surface area: 800 m$^2$/g) weighing 10 g was added to 300 mL of 60% nitric acid and then the fluid obtained was irradiated by an ultrasonic wave for 10 minutes, and then the fluid was filtered and the Ketjen Black was retrieved. The retrieved Ketjen Black was washed with water three times and then dried, so that acid-treated Ketjen Black was obtained. Then, 0.5 g of the acid-treated Ketjen Black obtained was mixed with 1.98 g $Fe(CH_3COO)_2$, 0.77 g $Li(CH_3COO)$, 1.10 g $C_6H_8O_7.H_2O$, 1.32 g $CH_3COOH$, 1.31 g $H_3PO_4$, and 120 mL distilled water, and the mixed fluid obtained was agitated by a stirrer for 1 hour, and then the mixed fluid was evaporated, dried and solidified at 100° C. in air and a mixture was collected. Then, the mixture obtained was introduced into a vibratory ball mill device and pulverization was conducted at 20 hz for 10 minutes. The powder obtained by pulverization was heated at 700° C. for 3 minutes in nitrogen, and a complex in which LiFePO$_4$ was supported by Ketjen Black was obtained.

1 g of the complex obtained was added to 100 mL of 30% hydrochloric acid aqueous solution, then the LiFePO$_4$ in the complex was dissolved by irradiating the fluid obtained with an ultrasonic wave for 15 minutes, and the remaining solid matter was filtered, washed with water and dried. A part of the solid matter after drying was heated to 900° C. in air and its weight loss was measured by TG analysis. Until it was confirmed that the weight loss was 100%, that is, no LiFePO$_4$ remained, the abovementioned process of dissolving LiFePO$_4$ in the hydrochloric acid aqueous solution, filtering, washing with water and drying was repeated, so that an oxidized carbon that did not contain any LiFePO$_4$ was obtained.

Then, 0.1 g of the oxidized carbon obtained was added to 20 ml of ammonia solution with pH 11, and ultrasonic irradiation was conducted for 1 minute. The fluid obtained was left for 5 hours and a solid phase area was precipitated. After the precipitation of the solid phase area, the supernatant fluid was removed, the remaining part was dried, and the weight of the solid object after drying was measured. By subtracting the weight of the solid object after drying from the weight of the initial oxidized carbon (0.1 g) and calculating the weight ratio of the subtracted result against the initial weight of the oxidized carbon (0.1 g), the contained amount of the "hydrophilic part" in the oxidized carbon was evaluated.

Fe(CH$_3$COO)$_2$, Li(CH$_3$COO), C$_6$H$_8$O$_7$.H$_2$O, CH$_3$COOH and H$_3$PO$_4$ were introduced into distilled water, and the compound fluid obtained was agitated by a stirrer for 1 hour, and then the compound fluid was evaporated, dried and solidified at 100° C. in air and then heated at 700° C. for 3 minutes in nitrogen, and LiFePO$_4$ fine particles with an initial particle diameter of 100 nm (the average particle diameter: 100 nm) were obtained. Then, commercially available LiFePO$_4$ gross particles (initial particle diameter: 0.5 to 1 μm, secondary particle diameter: 2 to 3 μm, the average particle diameter: 2.5 μm), the fine particles obtained and the oxidized carbon were mixed at the ratio of 90:9:1, and an electrode material was obtained. Then, 5% by mass of the total mass of polyvinylidene fluoride and an adequate quantity of N-methyl pyrrolidone were added to the electrode material and kneaded sufficiently so that a slurry was formed, and this slurry was coated on an aluminum foil, dried and then given a rolling treatment, and an electrode with an active material layer was obtained. The electrode density of the electrode was calculated from the measured values of the volume and weight of the active material layer on the aluminum foil in the electrode.

Example 2

The procedure of Example 1 was repeated except that the process in which 0.5 g the acid-treated Ketjen Black, 1.98 g Fe(CH$_3$COO)$_2$, 0.77 g Li(CH$_3$COO), 1.10 g C$_6$H$_8$O$_7$.H$_2$O, 1.32 g CH$_3$COOH, 1.31 g H$_3$PO$_4$ and 120 mL distilled water were mixed was changed into a process in which 1.8 g the acid-treated Ketjen Black, 0.5 g Fe(CH$_3$COO)$_2$, 0.19 g Li(CH$_3$COO), 0.28 g C$_6$H$_8$O$_7$.H$_2$O, 0.33 g CH$_3$COOH, 0.33 g H$_3$PO$_4$ and 250 mL distilled water were mixed.

Example 3

10 g of Ketjen Black used in Example 1 was added to 300 mL of 40% nitric acid and then the fluid obtained was irradiated by an ultrasonic wave for 10 minutes, and then the fluid was filtered and the Ketjen Black was retrieved. The retrieved Ketjen Black was washed with water three times and then dried, so that acid-treated Ketjen Black was obtained. Then, the procedure of Example 2 was repeated except that this acid-treated Ketjen Black 1.8 g was used instead of the acid-treated Ketjen Black 1.8 g used in Example 2.

Comparative Example 1

10 g of Ketjen Black used in Example 1 was added to 300 mL of 60% nitric acid and then the fluid obtained was irradiated by an ultrasonic wave for 1 hour, and then the fluid was filtered and the Ketjen Black was retrieved. The retrieved Ketjen Black was washed with water three times and then dried, so that acid-treated Ketjen Black was obtained. This acid-treated Ketjen Black was heated at 700° C. for 3 minutes in nitrogen. For the oxidized carbon obtained, the contained amount of the hydrophilic part was measured by using the same procedure as the procedure in Example 1. Also, using the oxidized carbon obtained, an electrode containing LiFePO$_4$ was produced by using the same procedure as the procedure in Example 1 and its electrode density was calculated.

Comparative Example 2

10 g of Ketjen Black used in Example 1 was added to 300 mL of 30% nitric acid and then the fluid obtained was irradiated by an ultrasonic wave for 10 minutes, and then the fluid was filtered and the Ketjen Black was retrieved. The retrieved Ketjen Black was washed with water three times and then dried, so that acid-treated Ketjen Black was obtained. Then, without pulverization by vibratory ball mill, it was heated at 700° C. for 3 minutes in nitrogen. For the oxidized carbon obtained, the contained amount of the hydrophilic part was measured by using the same procedure as the procedure in Example 1. Also, using the oxidized carbon obtained, an electrode containing LiFePO$_4$ was produced by using the same procedure as the procedure in Example 1 and its electrode density was calculated.

Comparative Example 3

To confirm the contribution of the hydrophilic part to electrode density, 40 mg of the oxidized carbon of Example 1 was added to 40 mL of pure water, ultrasonic irradiation was applied for 30 minutes to disperse the carbon in the pure water, then the dispersion was left for 30 minutes, after which the supernatant fluid was removed, then the remaining part was dried, and a solid object was obtained. For this solid object, the contained amount of the hydrophilic part was measured by using the same procedure as the procedure in Example 1. Also, using the solid object obtained, an electrode containing LiFePO$_4$ was produced by using the same procedure as the procedure in Example 1 and its electrode density was calculated.

Comparative Example 4

For the Ketjen Black raw material used in Example 1, the contained amount of the hydrophilic part was measured by using the same procedure as the procedure in Example 1. Also, using the Ketjen Black raw material, an electrode containing LiFePO$_4$ was produced by using the same procedure as the procedure in Example 1 and its electrode density was calculated.

FIG. 1 is a graph that shows the relationship between the contained amounts of the hydrophilic part in the carbons of Examples 1 to 3 and Comparative Examples 1 to 4 and the electrode densities of the electrodes of Examples 1 to 3 and Comparative Examples 1 to 4. As is evident from FIG. 1, if the contained amount of the hydrophilic part exceeds 8% by mass of the entire oxidized carbon, the electrode density begins to increase, and if it exceeds 9% by mass of the entire oxidized carbon, the electrode density begins to increase sharply, and if the contained amount of the hydrophilic part exceeds 10% by mass of the entire oxidized carbon, the high electrode density of 2.6 g/cc or more can be obtained. Also, as is evident from the comparison of the result for Example 1 and the result for Comparative Example 3, the hydrophilic part of the oxidized carbon largely contributes to the improvement of electrode density. Also, based on the observation of SEM images it was confirmed that the gelatinization of the oxidized carbon rapidly progresses as the contained amount of the hydrophilic part of the oxidized carbon is increased and the electrode density begins to increase rapidly.

(3) Evaluation as a Lithium Ion Secondary Battery
(i) Active material: LiNi$_{0.5}$Mn$_{0.3}$Co$_{0.2}$O$_2$ Example 4

Li$_2$CO$_3$, Ni(CH$_3$COO)$_2$, Mn(CH$_3$COO)$_2$ and Co(CH$_3$COO)$_2$ were introduced into distilled water, the compound fluid obtained was agitated by a stirrer for 1 hour, and then the compound fluid was evaporated, dried and solidified at 100° C. in air, mixed by using a ball mill, and then heated at 800° C. in air for 10 minutes, and LiNi$_{0.5}$Mn$_{0.3}$Co$_{0.2}$O$_2$ fine particles with an average diameter of 0.5 µm were obtained. These fine particles and the oxidized carbon in Example 1 were mixed at the ratio by mass of 90:10 and a preliminary compound was obtained. Then, 86% by mass of commercially available LiNi$_{0.5}$Mn$_{0.3}$Co$_{0.2}$O$_2$ gross particles (average diameter: 5 µmin), 9% by mass of the abovementioned preliminary compound and 2% by mass of acetylene black (primary particle diameter: 40 nm) were mixed, and then 3% by mass of polyvinylidene fluoride and an adequate quantity of N-methyl pyrrolidone were added and kneaded sufficiently so that a slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 4.00 g/cc. Further, using the positive electrode obtained, a lithium ion secondary battery was manufactured in which 1M LiPF$_6$ in a 1:1 ethylene carbonate/diethyl carbonate solution was used as an electrolytic solution, and in which lithium was used as a counter electrode.

Charging/discharging characteristics of the lithium ion secondary battery obtained were measured for a broad range of current densities.

Example 5

94% by mass of commercially available LiNi$_{0.5}$Mn$_{0.3}$Co$_{0.2}$O$_2$ particles (average diameter: 5 µm), 2% by mass of the oxidized carbon of Example 1 and 2% by mass of acetylene black (primary particle diameter: 40 nm) were mixed, and then 2% by mass of polyvinylidene fluoride and an adequate quantity of N-methyl pyrrolidone were added and kneaded sufficiently so that a slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.81 g/cc. Further, using the positive electrode obtained, a lithium ion secondary battery was manufactured in which 1M LiPF$_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Comparative Example 5

94% by mass of commercially available LiNi$_{0.5}$Mn$_{0.3}$Co$_{0.2}$O$_2$ particles (average diameter: 5 µm) and 4% by mass of acetylene black (primary particle diameter: 40 nm) were mixed, and then 2% by mass of polyvinylidene fluoride and an adequate quantity of N-methyl pyrrolidone were added and kneaded sufficiently so that a slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.40 g/cc. Further, using the positive electrode obtained, a lithium ion secondary battery was manufactured in which 1M LiPF$_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Figure 2:
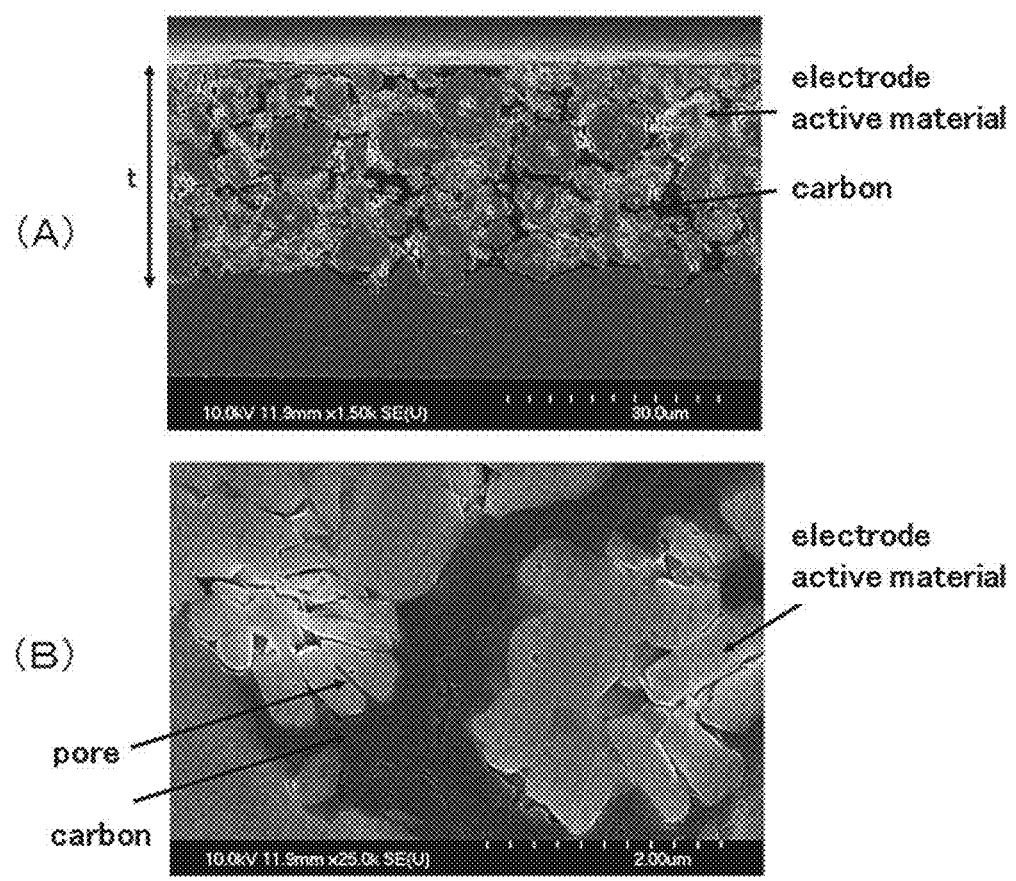
FIG. 2 shows SEM images of the cross-section of an electrode of a working example: (A) at a magnification of 1,500 and (B) at a magnification of 25,000.
Figure 3:
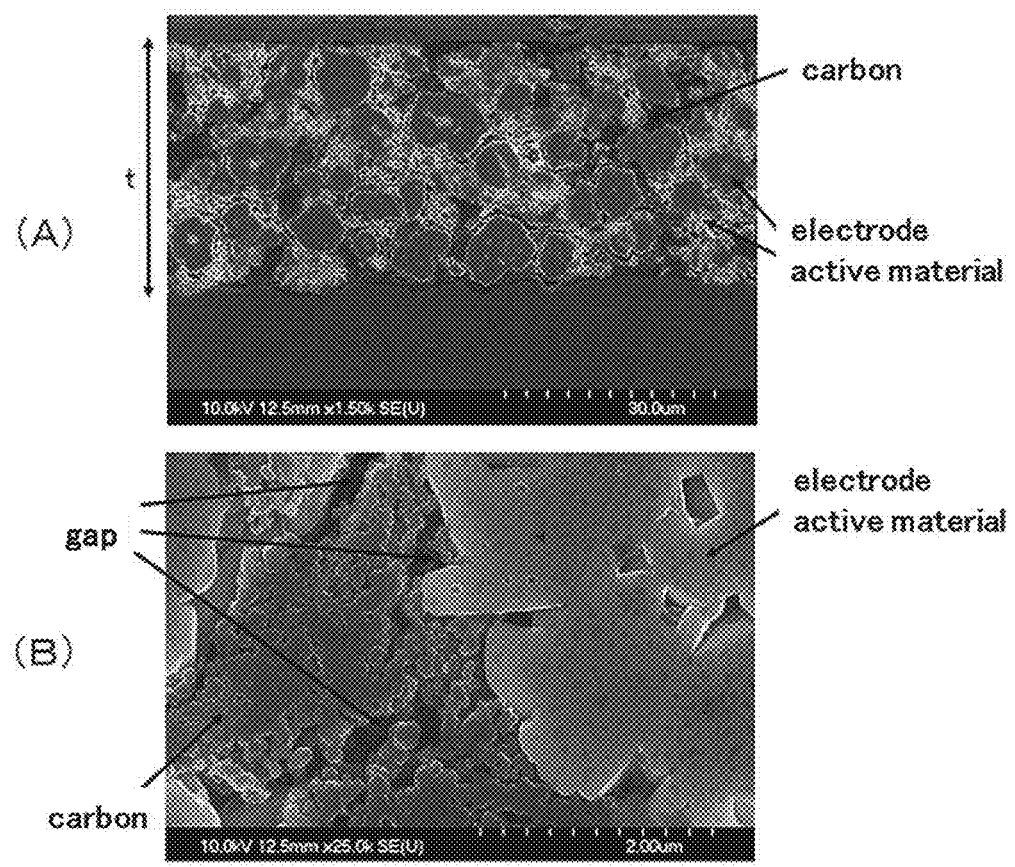
FIG. 3 shows SEM images of the cross-section of an electrode of a comparative example: (A) at a magnification of 1,500 and (B) at a magnification of 25,000.

FIG. 2 shows SEM images of the cross-section of the positive electrode of the lithium ion secondary battery of Example 5 and FIG. 3 shows SEM images of the cross-section of the positive electrode of the lithium ion secondary battery of Comparative Example 5. In both figures, (A) is an image at a magnification of 1,500 and (B) is an image at a magnification of 25,000. In FIG. 2(A) and FIG. 3(A), the thickness of the active material layer is shown as t. It can be seen that the active material layer in the lithium ion secondary battery of Example 5 is thinner than the active material layer in the lithium ion secondary battery of Comparative Example 5, even though the contained amount of the particles of the active material and the contained amount of carbon in the active material layer are the same. Also, from the comparison of FIG. 2(A) and FIG. 3(A), it was found that, in the active material layer of the lithium ion secondary battery of Example 5, the particles of the active material approach each other and the ratio of the area occupied by carbon to the area of the entire active material layer in the image is small. Further, the forms of carbon in FIG. 2(B) and FIG. 3(B) are remarkably different. In the active material layer of the lithium ion secondary battery of Comparative Example 5 (FIG. 3(B)), the grain boundaries of carbon (acetylene black) primary particles are clear and there are large gaps adjacent to the surface boundary between the particles of the active material and the carbon particles, especially adjacent to the pores formed on the surface of the particles of the active material, in addition to the gaps between the carbon particles, whereas in the active material layer of the lithium ion secondary battery of Example 5 (FIG. 2(B)), the grain boundaries of carbon primary particles are not discernible, the carbon is paste-like and this paste-like carbon intrudes into the deep parts of the pores of the particles of the active material that have a width of 50 nm or less (ie. gaps between the primary particles), and gaps are virtually absent. Moreover, it is shown that 90% or more of the surface of the particles of the active material contact the paste-like carbon. It is assured that the difference between the electrode densities in the positive electrodes of the lithium ion secondary batteries in Example 5 and Comparative Example 5 is derived from the above-described difference in the forms of carbon.

As mentioned above, because the active material layer in Example 5 is thinner than the active material layer in Comparative Example 5, it is assured that the material filling rate in the former is large, and the material filling rate was confirmed in the following formulae. The theoretical electrode density refers to the electrode density when gaps in the active material layer are assumed to be 0%.

Material filling rate (%)=electrode density×100/theoretical electrode density       (I)

Theoretical electrode density (g/cc)=100/(a/X+b/Y+(100−a−b)/Z)       (II)

where:

a: % by mass of the active material against the entire active material layer b: % by mass of carbon against the entire active material layer 100−a−b: % by mass of polyvinylidene fluoride against the entire active material layer X: true density of the active material Y: true density of carbon black Z: true density of polyvinylidene fluoride As a result, the material filling rate of the active material layer in Example 5 was 86.8% and the material filling rate of the active material layer in Comparative Example 5 was 79.1%; in the electrode containing the paste-like conductive carbon derived from the oxidized carbon, an improvement in the filling rate of as much as 7.7% was observed.

Figure 4:
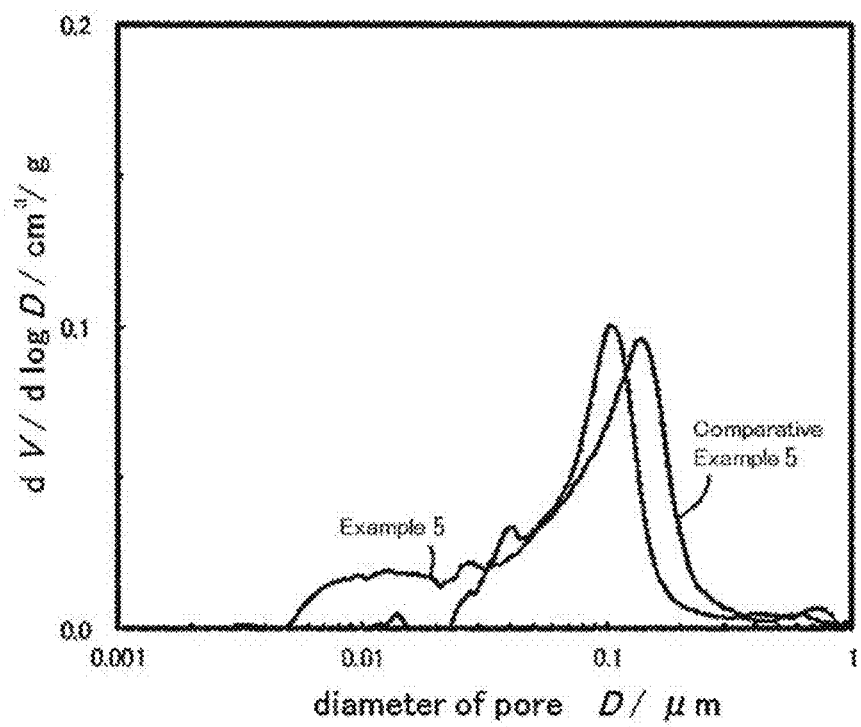
FIG. 4 shows a graph that shows the result of measuring the distribution of pores in electrodes shown in FIGS. 2 and 3 by the mercury intrusion method.

FIG. 4 shows the result of the measurement of the pore distribution in the active material layer of Example 5 and the active material layer of Comparative Example 5 by the mercury intrusion method. The result shows that, in the active material layer in Comparative Example 5, pores with a diameter of 20 nm or less are virtually absent, and most of the pores show peaks at the diameter of approximately 30 nm, the diameter of approximately 40 nm, and the diameter of approximately 150 nm. Presumably, the pores that show a peak at the diameter of approximately 150 nm are pores that are mainly attributable to the particles of an active material and the pores that show peaks at the diameter of approximately 30 nm and the diameter of approximately 40 nm are the pores that are mainly found between particles of acetylene black. On the other hand, it is assured that, in the active material layer in Example 5, the number of pores with a diameter of approximately 100 nm or more among the pores in the active material layer in Comparative Example 5 is decreased, and instead the number of pores with a diameter within the range of 5 to 40 nm is increased. It is considered that the decrease in the number of pores with a diameter of approximately 100 nm or more is because the pores of the particles of the active material are covered with the paste-like conductive carbon. Moreover, the pores with a diameter within the range of 5 to 40 nm, which are presumably pores in the dense, paste-like conductive carbon that is derived from the oxidized carbon, are of a sufficiently large size to allow for the electrolytic solution in an electric storage device to go through the paste-like conductive carbon to contact the active material particles. Therefore, it is concluded that the paste-like conductive carbon in the electrode does not inhibit the impregnation of the electrolytic solution in the electric storage device.

Figure 5:
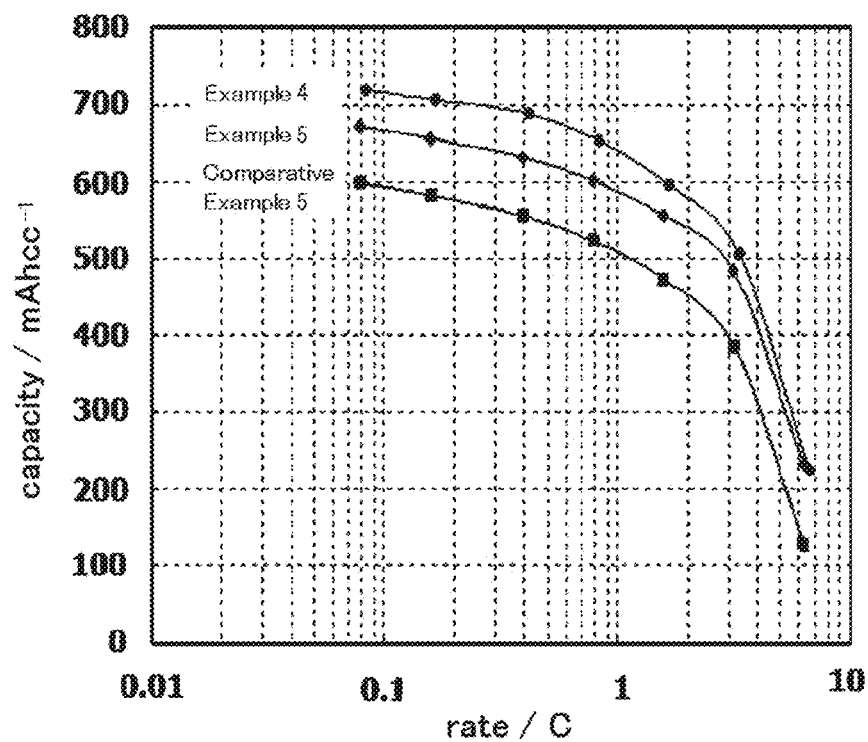
FIG. 5 shows the rate characteristics of a lithium ion secondary battery that has an electrode of a working example or a comparative example.

FIG. 5 is a graph that shows the relationship between the rate and the discharge capacity per volume of the positive electrode active material layer in the lithium ion secondary batteries of Example 4, Example 5 and Comparative Example 5. The lithium ion secondary battery of Example 5 shows a higher capacity than the lithium ion secondary battery of Comparative Example 5, and the lithium ion secondary battery of Example 4 shows a higher capacity than the lithium ion secondary battery of Example 5. That is, as the electrode density of the positive electrode increases, the discharge capacity per volume also increases. Also, these secondary batteries show almost the same rate characteristics. This reveals that the paste-like conductive carbons contained in the active material layers in the secondary batteries of Example 4 and Example 5, which are derived from the oxidized carbon and have become dense, have sufficient electroconductivity to serve as a conductive agent and do not inhibit the impregnation of the electrolytic solution in the secondary battery. Also, the positive electrode of the secondary battery in Example 4 shows a higher electrode density than the positive electrode of the secondary battery in Example 5, even though the contained amount of the particles of the active material and the contained amount of carbon in the active material layer are almost the same, which is presumably because the fine particles are pushed out into and fill the gaps formed between the adjacent gross particles together with the past-like oxidized carbon of Example 1 while pressing the oxidized carbon.

Figure 6:
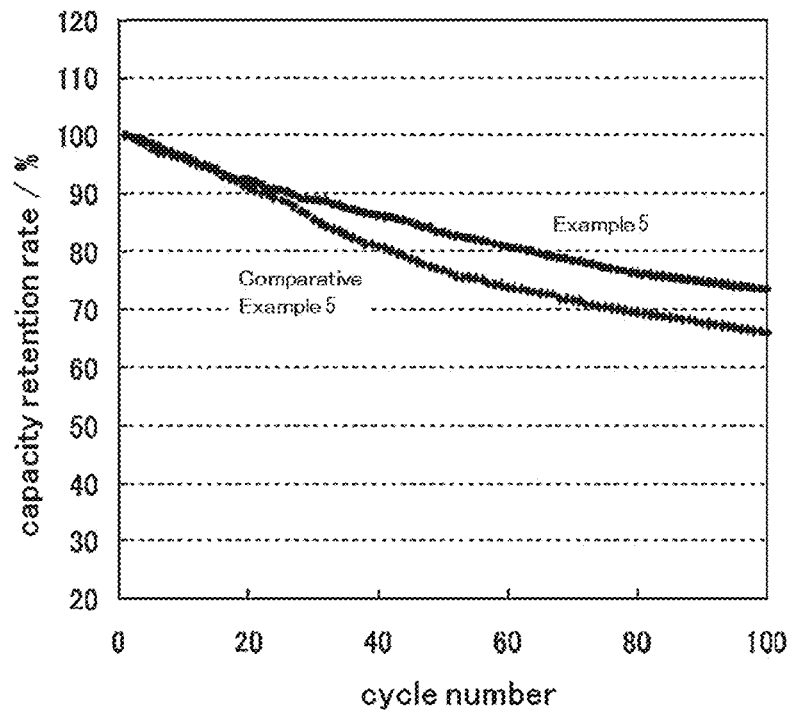
FIG. 6 shows a graph that shows the cycle characteristics of a lithium ion secondary battery, the rate characteristics of which are shown in FIG. 5.

For the lithium secondary batteries of Example 5 and Comparative Example 5, charging/discharging was repeated within the range of 4.6 to 3.0 V under the condition of 60° C. and the charging/discharging rate of 0.5 C. FIG. 6 shows the result of the cycling characteristics obtained. The result shows that the secondary battery of Example 5 has better cycle characteristics than the secondary battery of Comparative Example 5. From a comparison of FIG. 2 and FIG. 3, it is considered that this is because almost all of the surface of the particles of the active material in the active material layer in Example 5 is covered with the dense paste-like carbon up to the point of the depth of the pores on the surface of the particles of the active material and that this paste-like carbon inhibits the degradation of the active material.

(ii) Active Material: $LiCoO_2$

Example 6

$Li_2CO_3$, $Co(CH_3COO)_2$ and $C_6H_8O_7 \cdot H_2O$ were introduced into distilled water, the compound fluid obtained was agitated by a stirrer for 1 hour, and then the compound fluid was evaporated, dried and solidified at 100° C. in air and was then heated at 800° C. in air for 10 minutes, and $LiCoO_2$ fine particles with an average diameter of 0.5 μm were obtained. These fine particles and the oxidized carbon obtained in Example 1 were mixed at the mass ratio of 90:10, and a preliminary mixture was obtained. Then, 86% by mass of the total mass of commercially available LiCoO$_2$ gross particles (average particle diameter: 10 μm), 9% by mass of the preliminary mixture and 2% by mass of acetylene black (primary particle diameter: 40 nm) were mixed, and then 3% by mass of polyvinylidene fluoride and an adequate quantity of N-methyl pyrrolidone were added and kneaded sufficiently so that a slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 4.25 g/cc. Further, using the positive electrode obtained, a lithium ion secondary battery was manufactured in which 1M LiPF$_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Example 7

94% by mass of commercially available LiCoO$_2$ particles (average diameter: 10 μm), 2% by mass of the oxidized carbon of Example 1 and 2% by mass of acetylene black (primary particle diameter: 40 nm) were mixed, and then 2% by mass of polyvinylidene fluoride and an adequate quantity of N-methyl pyrrolidone were added and kneaded sufficiently so that a slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 4.05 g/cc. Further, using the positive electrode obtained, a lithium ion secondary battery was manufactured in which 1M LiPF$_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Comparative Example 6

94% by mass of commercially available LiCoO$_2$ particles (average diameter: 10 μm) and 4% by mass of acetylene black (primary particle diameter: 40 nm) were mixed, and then 2% by mass of polyvinylidene fluoride and an adequate quantity of N-methyl pyrrolidone were added and kneaded sufficiently so that a slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.60 g/cc. Further, using the positive electrode obtained, a lithium ion secondary battery was manufactured in which 1M LiPF$_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

For the active material layer in Example 7 and the active material layer in Comparative Example 6, the material filling rates were confirmed by using the abovementioned formulae (I) and (II). As a result, the material filling rate of the active material layer in Example 7 was 85.6% and the material filling rate of the active material layer in Comparative Example 6 was 79.1%; in the electrode containing the paste-like conductive carbon derived from the oxidized carbon, an improvement in the filling rate of as much as 6.5% was observed.

Figure 7:
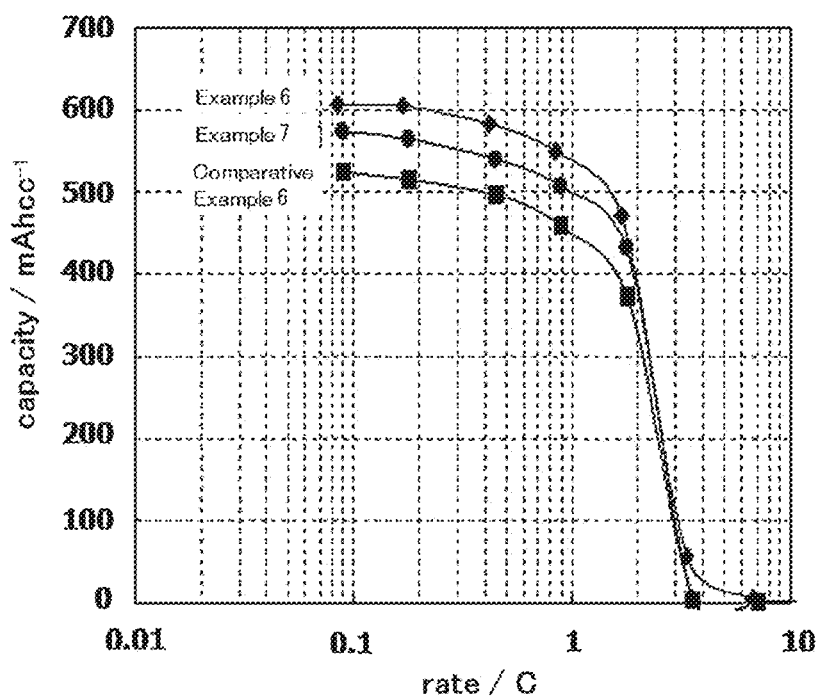
FIG. 7 shows the rate characteristics of a lithium ion secondary battery that has an electrode of a working example or a comparative example.
Figure 8:
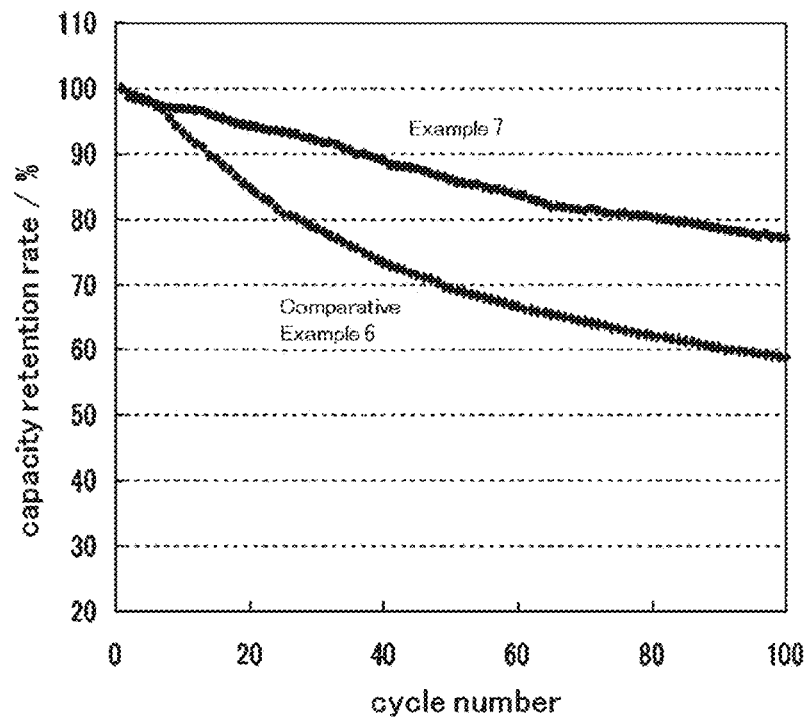
FIG. 8 shows a graph that shows the cycle characteristics of a lithium ion secondary battery, the rate characteristics of which are shown in FIG. 7.

FIG. 7 is a graph that shows the relationship between the rate and the discharge capacity per volume of the positive electrode active material layer in the lithium ion secondary batteries of Example 6, Example 7 and Comparative Example 6. In line with the result shown in FIG. 5, FIG. 7 shows that the discharging capacity increases as the electrode density increases and almost the same rate characteristics are obtained. For the lithium ion secondary batteries of Example 7 and Comparative Example 6, charging/discharging was repeated within the range of 4.3 to 3.0 V under the condition of 60° C. and the charging/discharging rate of 0.5 C. FIG. 8 shows the result of the cycling characteristics obtained. In line with the result shown in FIG. 6, FIG. 8 shows that the secondary battery of Example 7 has better cycle characteristics than the secondary battery of Comparative Example 6.

(iii) Active Material: Li$_{1.2}$Mn$_{0.56}$Ni$_{0.17}$Co$_{0.07}$O$_2$

Example 8

1.66 g Li (CH$_3$COO), 2.75 g Mn(CH$_3$COO)$_{2.4}$H$_2$O, 0.85 g Ni(CH$_3$COO)$_{2.4}$H$_2$O, 0.35 g Co(CH$_3$COO)$_{2.4}$H$_2$O and 200 mL distilled water were mixed, solvent was removed by using the evaporator, and a mixture was collected. Then, the mixture collected was introduced into a vibratory ball mill device, pulverization at 15 hz was conducted for 10 minutes, and an even mixture was obtained. The mixture after pulverization was heated at 900° C. in air for 1 hour and crystals of a lithium excess solid solution Li$_{1.2}$Mn$_{0.56}$Ni$_{0.17}$Co$_{0.07}$O$_2$ with an average particle diameter of 1 μm or less were obtained. 91% by mass of these crystal particles and 4% by mass of the oxidized carbon of Example 1 were mixed, and then 5% by mass of polyvinylidene fluoride and an adequate quantity of N-methyl pyrrolidone were added and kneaded sufficiently so that a slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.15 g/cc. Further, using the positive electrode obtained, a lithium ion secondary battery was manufactured in which 1M LiPF$_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Comparative Example 7

91% by mass of Li$_{1.2}$Mn$_{0.36}$Ni$_{0.17}$Co$_{0.07}$O$_2$ particles that were obtained in Example 8 and 4% by mass of acetylene black (primary particle diameter: 40 nm) were mixed, and then 5% by mass of polyvinylidene fluoride and an adequate quantity of N-methyl pyrrolidone were added and kneaded sufficiently so that a slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 2.95 g/cc. Further, using the positive electrode obtained, a lithium ion secondary battery was manufactured in which 1M $LiPF_6$ in a 1:1 ethylene carbonate/diethyl carbonate solution was used as an electrolytic solution, and in which lithium was used as a counter electrode. Charging/discharging characteristics of the lithium ion secondary battery obtained were measured for a broad range of current densities.

Figure 9:
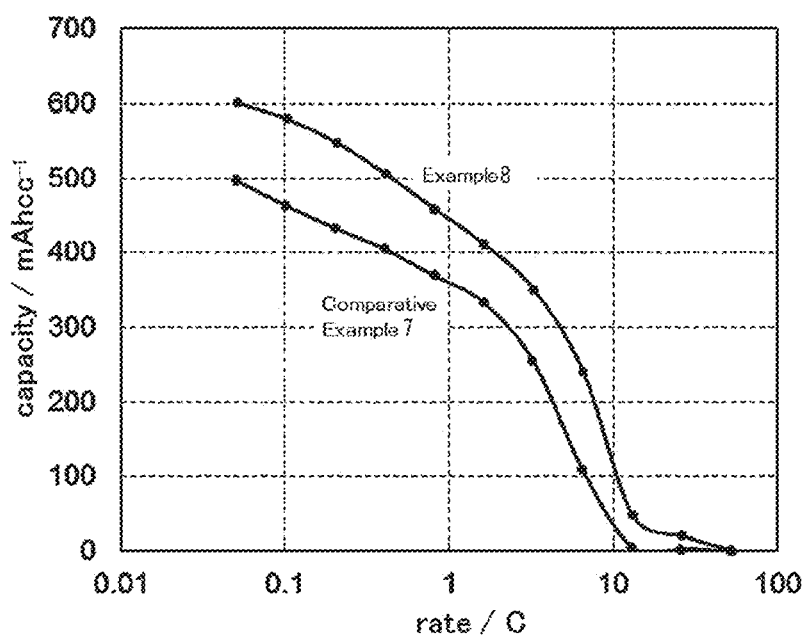
FIG. 9 shows the rate characteristics of a lithium ion secondary battery that has an electrode of a working example or a comparative example.
Figure 10:
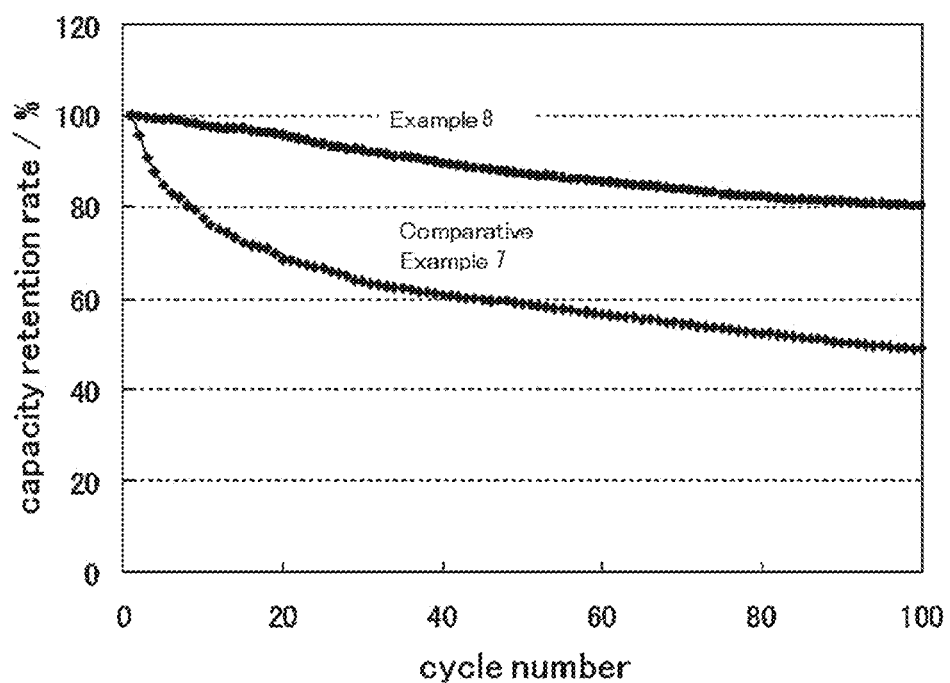
FIG. 10 shows a graph that shows the cycle characteristics of a lithium ion secondary battery, the rate characteristics of which are shown in FIG. 9.

FIG. 9 is a graph that shows the relationship between the rate and the discharge capacity per volume of the positive electrode active material layer in the lithium ion secondary batteries of Example 8 and Comparative Example 7. In line with the result shown in FIG. 5, FIG. 9 shows that the discharging capacity increases as the electrode density increases and almost the same rate characteristics are obtained. For the lithium ion secondary batteries of Example 8 and Comparative Example 7, charging/discharging was repeated within the range of 4.8 to 2.5 V under the condition of 25° C. and the charging/discharging rate of 0.5 C. FIG. 10 shows the result of the cycling characteristics obtained. As with the result shown in FIG. 6, FIG. 10 shows that the secondary battery of Example 8 has better cycle characteristics than the secondary battery of Comparative Example 7.

(iv) Change of Oxidized Carbon

Example 9

10 g of furnace black with pores (average primary particle diameter: 20 nm, the BET specific surface area: 1400 $m^2/g$) was added to 300 mL of 60% nitric acid, an ultrasonic wave was irradiated for 10 minutes into the fluid obtained, and the fluid was filtrated and the furnace black was retrieved. The retrieved furnace black was washed with water three times and then dried, so that acid-treated furnace black was obtained. 0.5 g of this acid-treated furnace black, 1.98 g $Fe(CH_3COO)_2$, 0.77 g $Li(CH_3COO)$, 1.10 g $C_6H_8O_7 \cdot H_2O$, 1.32 g $CH_3COOH$, 1.31 g $H_3PO_4$, and 120 mL distilled water were mixed. The compound fluid obtained was agitated for 1 hour by a stirrer, and then the compound fluid was evaporated, dried and solidified at 100° C. in air, and a mixture was collected. Then, the mixture obtained was introduced into a vibratory ball mill device and pulverization was conducted at 20 hz for 10 minutes. The powder after pulverization was heated at 700° C. for 3 minutes in nitrogen, and a complex in which $LiFePO_4$ was supported by the furnace black was obtained.

1 g of the complex obtained was added to 100 mL of 30% hydrochloric acid solution, and $LiFePO_4$ in the complex was dissolved while the fluid obtained was irradiated by an ultrasonic wave for 15 minutes, and then the remaining solid body was filtered, washed by water, and dried. A part of the solid body after drying was heated to 900° C. in air and weight loss was measured by TG analysis. The process of dissolution of $LiFePO_4$ by the aforementioned hydrochloric acid solution, filtration, water washing and drying was repeated until it was confirmed that weight loss was 100%, that is, no $LiFePO_4$ remained, so that a oxidized carbon that did not contain any $LiFePO_4$ was obtained.

Then, 0.1 g of the oxidized carbon obtained was added to 20 mL of ammonia solution with pH 11, and ultrasonic irradiation was applied for 1 minute. The fluid obtained was left for 5 hours and a solid phase area was precipitated. After the precipitation of the solid phase area, the supernatant fluid was removed, the remaining part was dried, and the weight of the solid object after drying was measured. By subtracting the weight of the solid object after drying from the weight of the initial oxidized carbon (0.1 g) and calculating the weight ratio of the subtracted result against the initial weight of the oxidized carbon (0.1 g), the contained amount of the "hydrophilic part" in the oxidized carbon was evaluated. This oxidized carbon contained 13% of hydrophilic part. The contained amount of the hydrophilic part in the furnace black with pores, which was used as a raw material, was only 2%.

Figure 11:
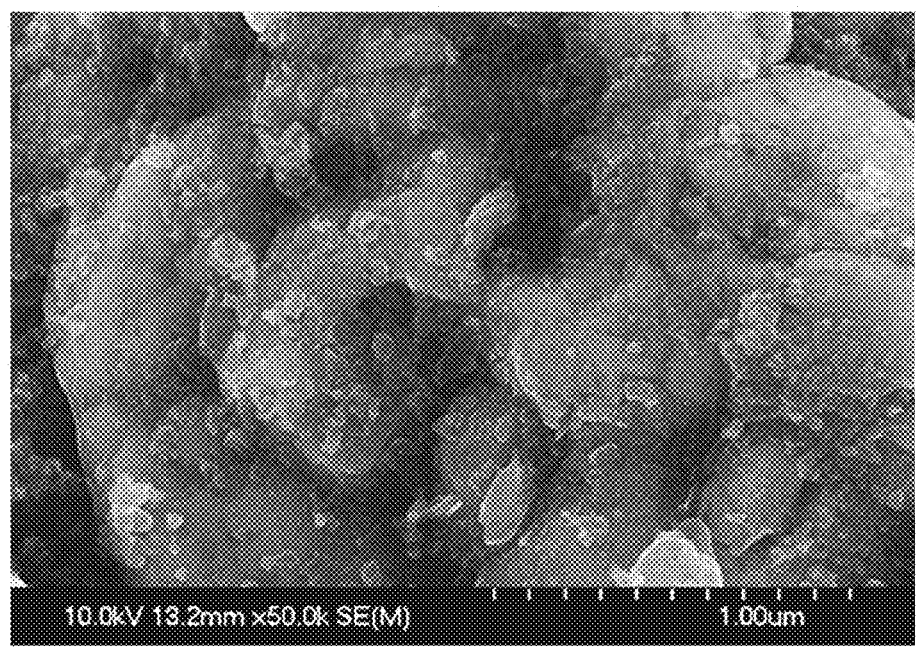
FIG. 11 shows an SEM image at a magnification of 50,000 of a mixture that is obtained by dry blending of an oxidized carbon, acetylene black and particles of an active material.

94% by mass of commercially available $LiNi_{0.5}Mn_{0.3}Co_{0.2}O_2$ particles (average diameter: 5 μm), 2% by mass of the oxidized carbon obtained, and 2% by mass of acetylene black (primary particle diameter: 40 nm) were mixed. FIG. 11 shows an SEM image of the mixture obtained at a magnification of 50,000. The surface of the particles is partly covered with a paste-like material and their outline form is not clearly identifiable; this paste-like material is the oxidized carbon that is obtained by oxidizing the furnace black raw material, which spreads while covering the surface of the particles due to the pressure during mixing. Also, it can be observed that acetylene black with an average primary particle diameter 40 nm is well dispersed. It is generally said that fine particles easily aggregate, but by virtue of the oxidized carbon, aggregation of the fine particles is effectively inhibited.

Then, 2% by mass of the total mass of polyvinylidene fluoride and an adequate quantity of N-methyl pyrrolidone were added to the mixture obtained and kneaded sufficiently so that a slurry was formed, and this slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.80 g/cc. Further, using the positive electrode obtained, a lithium ion secondary battery was manufactured in which a solution of 1M $LiPF_6$ in a 1:1 ethylene carbonate/diethyl carbonate solution was used as an electrolytic solution, and in which lithium was used as a counter electrode. For the battery obtained, charging/discharging characteristics were evaluated for a broad range of current densities. Also, charging/discharging was repeated within the range of 4.6 to 3.0 V under the condition of 60° C. and the charging/discharging rate of 0.5 C.

Example 9 and Comparative Example 5 are different in terms of the kind of carbon used for a positive electrode, but otherwise the same. In Example 9, the oxidized carbon obtained from a furnace black raw material with pores and acetylene black were used, whereas in Comparative Example 5, only acetylene black was used. The electrode density of the positive electrode in Comparative Example 5 was 3.40 g/cc, so the electrode density was significantly improved by using the oxidized carbon. Example 9 and Example 5 are also different in terms of the kind of oxidized carbon used for a positive electrode, but otherwise the same. In Example 5, the oxidized carbon that was obtained from the Ketjen Black raw material was used, whereas in Example 9, the oxidized carbon obtained from the furnace black raw material was used. The electrode density of the positive electrode in Example 5 was 3.81 g/cc, so almost the same electrode density was obtained notwithstanding the difference in the raw materials in the oxidized carbon.

Figure 12:
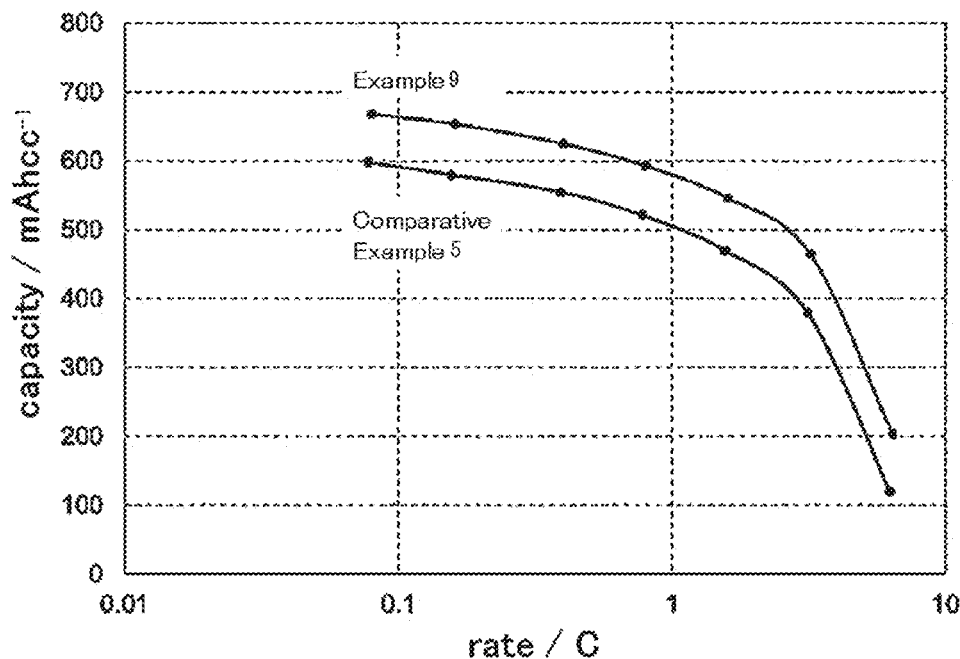
FIG. 12 shows the rate characteristics of a lithium ion secondary battery that has an electrode of a working example or a comparative example.
Figure 13:
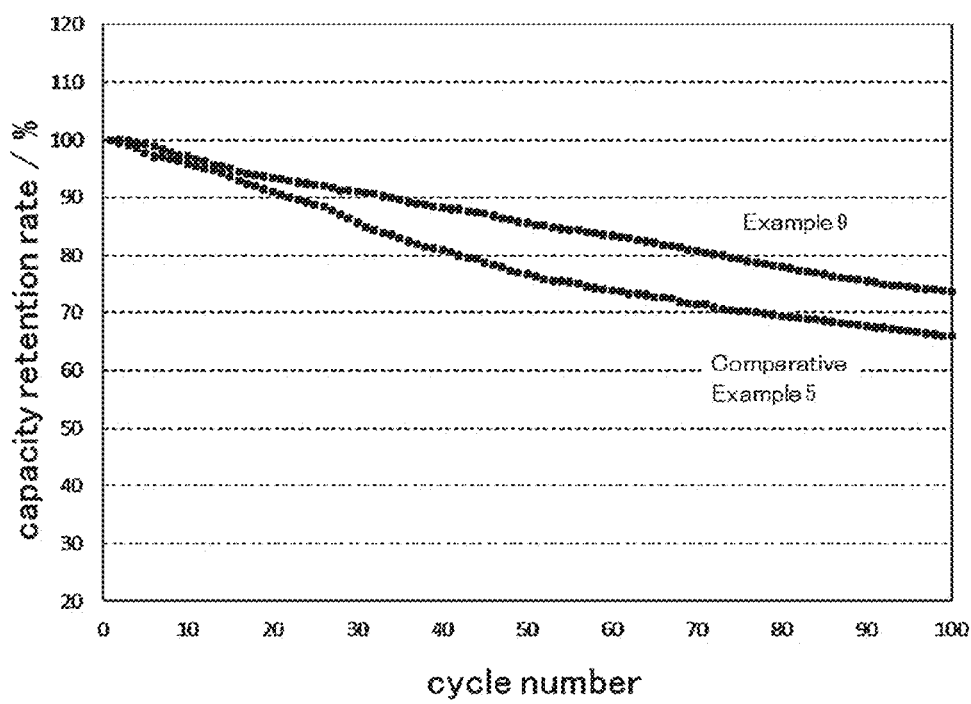
FIG. 13 shows a graph that shows the cycle characteristics of a lithium ion secondary battery, the rate characteristics of which are shown in FIG. 12.

FIG. 12 shows the relationship between the rate and the discharge capacity per volume of the positive electrode active material layer of the lithium ion secondary batteries in Example 9 and Comparative Example 5, and FIG. 13 shows the result of the cycling characteristics of the lithium ion secondary batteries in Example 9 and Comparative Example 5. FIG. 12 shows that the discharge capacity increases as the electrode density increases and almost the same rate characteristics are obtained. Also, comparison of the rate characteristics of the secondary battery of Example 5 in FIG. 5 and the rate characteristics of the secondary battery of Example 9 in FIG. 12 reveals that almost the same rate characteristics are obtained notwithstanding the difference in the raw materials in the oxidized carbon used for the positive electrodes. FIG. 13 shows that the secondary battery of Example 9 has better characteristics than the secondary battery of Comparative Example 5. Also, comparison of the cycling characteristics of the secondary battery of Example 5 in FIG. 6 and the cycling characteristics of the secondary battery of Example 9 in FIG. 13 reveals that almost the same rate characteristics can be obtained notwithstanding the difference in the raw materials in the oxidized carbon used for the positive electrodes.

(3) Solubility of Active Material

As mentioned above, it is considered that the excellent cycle characteristics of the lithium ion secondary battery with a positive electrode of the present invention is because almost all the surface of the particles of the active material is covered with the paste-like carbon and this paste-like carbon inhibits the degradation of the active material. To confirm this, the solubility of the active material was investigated.

Each of the oxidized carbon in Example 1 and acetylene black was mixed with $LiFePO_4$ particles with an average diameter of 0.22 μm, $LiCoO_2$ particles with an average diameter of 0.26 μm, and $LiNi_{0.5}Mn_{0.3}Co_{0.2}O_2$ with an average diameter of 0.32 μm at the ratio by mass of 5:95, and then 5% by mass of the total mass of polyvinylidene fluoride and an adequate quantity of N-methyl pyrrolidone were added and kneaded sufficiently so that a slurry was formed, and this slurry was coated on an aluminum foil, dried and then given a rolling treatment, and an electrode was obtained. By using this electrode and an electrolyte in which 1,000 ppm water was added to a solution of 1M $LiPF_6$ in a 1:1 ethylene carbonate/diethyl carbonate solution, a coin-type battery was manufactured. In this test, fine particles with a large specific surface area were used in order to increase the area of the active material that contacts the electrolytic solution. Also, 1000 ppm water was added for the purpose of conducting an accelerated test because an active material dissolves more easily when there is more water. This battery was left for 1 week at 60° C., then it was disintegrated, and then the electrolyte was collected and the amount of metal dissolved in the electrolyte was analyzed by using an ICP emission analysis device. Table 1 shows the result obtained.

TABLE 1

| | amount of dissolution of active material/% | | | | decrease ratio |
|---|---|---|---|---|---|
| | Mn | Fe | Co | Ni | (against acetylene black) |
| $LiFePO_4$ + acetylene black | | 1.52 | | | |
| $LiFePO_4$ + carbon in Example 1 | | 0.93 | | | −39% |
| $LiCoO_2$ + acetylene black | | | 13.1 | | |
| $LiCoO_2$ + carbon in Example 1 | | | 6.05 | | −54% |
| $LiNi_{0.5}Mn_{0.3}Co_{0.2}O_2$ + acetylene black | 4.5 | | 1.59 | 1.32 | |
| $LiNi_{0.5}Mn_{0.3}Co_{0.2}O_2$ + carbon in Example 1 | 1.9 | | 1.35 | 0.93 | −44% |

As is evident from Table 1, the paste-like conductive carbon that is derived from the oxidized carbon in Example 1 remarkably inhibits the dissolution of the active material into the electrolyte, compared with acetylene black. This is conceivably because the oxidized carbon of Example 1, even if its active material is fine particles with an average particle diameter of 0.22 to 0.32 μm, effectively inhibits the aggregation of these fine particles and covers almost all the surface of the particles of the active material.

(4) Mixing State of Oxidized Carbon and Active Material

The following experiment was performed to confirm the mixing state of an active material and carbon.

(i) Mixture of Fine Particles and Carbon

Figure 14:
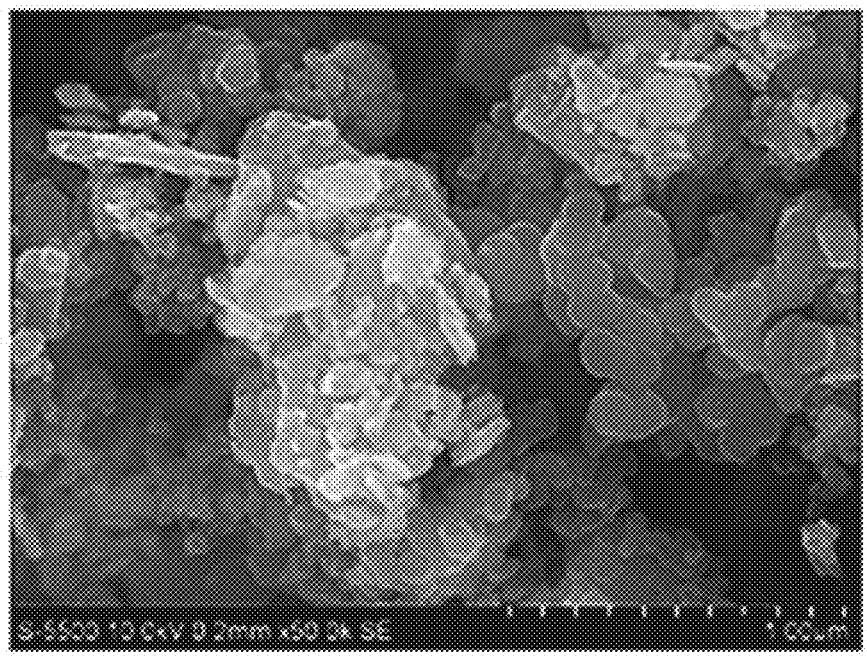
FIG. 14 shows SEM images at a magnification of 50,000 of a mixture that is obtained by dry blending of an oxidized carbon or acetylene black and fine particles of an active material.
Figure 14:
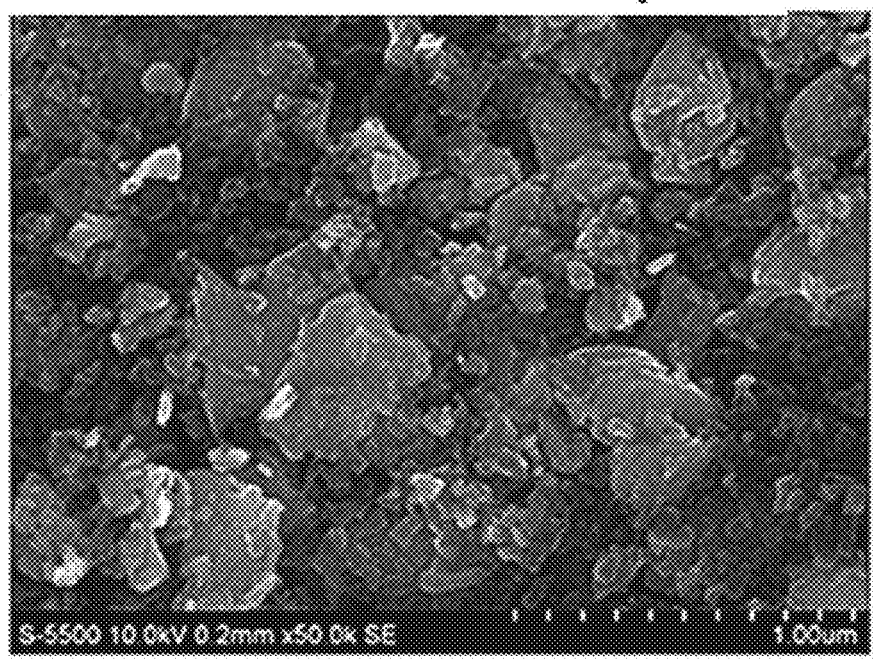

Each of the oxidized carbon of Example 1 and acetylene black was introduced into a mortar with $LiNi_{0.5}Mn_{0.3}Co_{0.2}O_2$ fine particles with an average particle diameter of 0.32 μm at the ratio by mass of 20:80 and dry blending was conducted. FIG. 14 shows SEM images at a magnification of 50,000. It was found that, when acetylene black is used as carbon, compared with the case where the oxidized carbon of Example 1 is used, the fine particles aggregate even under the same mixing condition. Therefore, it was found that the oxidized carbon of Example 1 effectively inhibits the aggregation of the fine particles.

(ii) Mixture of Gross Particles and Carbon

Figure 15:
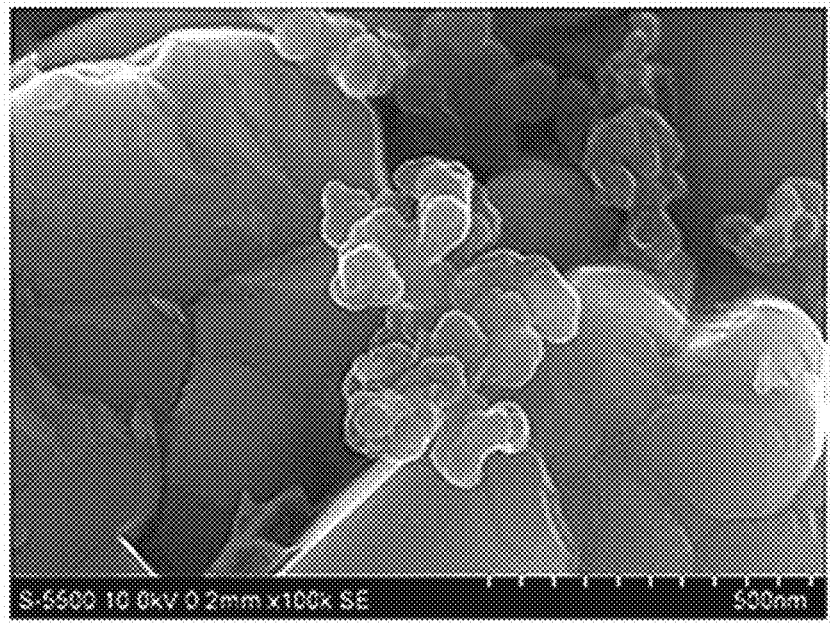
FIG. 15 shows SEM images at a magnification of 100,000 of a mixture that is obtained by dry blending of an oxidized carbon or acetylene black and gross particles of an active material.
Figure 15:
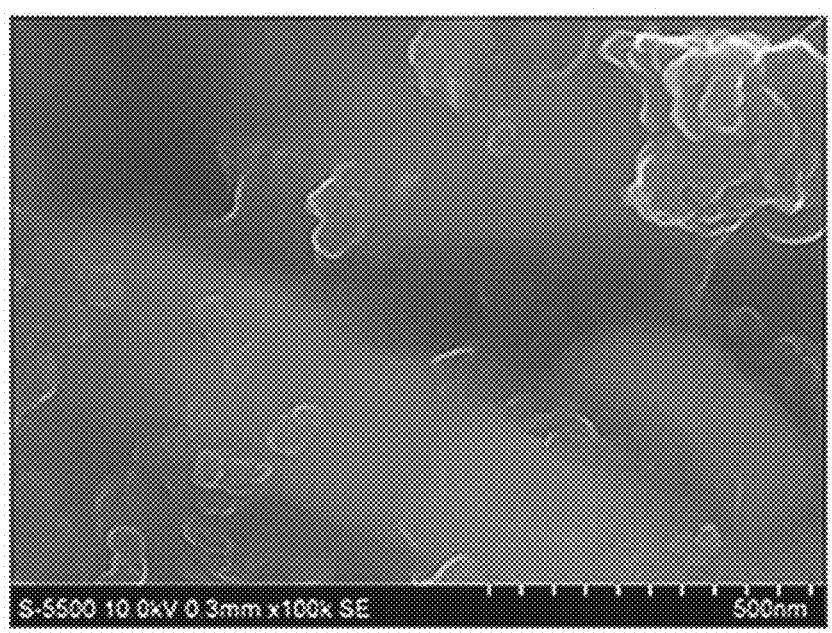

Each of the oxidized carbon of Example 1 and acetylene black was introduced into a mortar with $LiNi_{0.5}Mn_{0.3}Co_{0.2}O_2$ gross particles with an average particle diameter of 5 μm at the ratio by mass of 4:96 and dry blending was conducted. FIG. 15 shows SEM images at a magnification of 100,000. It was found that, when acetylene black is used as carbon, the gross particles and acetylene black exist separately, but when the oxidized carbon of Example 1 is used, the gross particles are covered by a paste-like object, and the outline form of the gross particles is not clearly identifiable. This paste-like object is the oxidized carbon obtained in Example 1, which spreads while covering the surface of the gross particles due to the pressure of blending. It is considered that, by a rolling treatment when an electrode is produced, the oxidized carbon of Example 1 further spreads in a paste-like manner and becomes dense while covering the surface of the particles of the active material, the particles of the active material approach each other, and accordingly, the past-like oxidized carbon is pushed out into the gaps formed between the adjacent particles of the active material and fills the gaps densely while covering the surface of the particles of the active material, so that the amount of the active material per unit volume in the electrode is increased and the electrode density is increased.

(5) Usage of Conductive Carbon Mixture (i) Active Material: $LiNi_{0.5}Mn_{0.3}Co_{0.2}O_2$

Example 10

Figure 16:
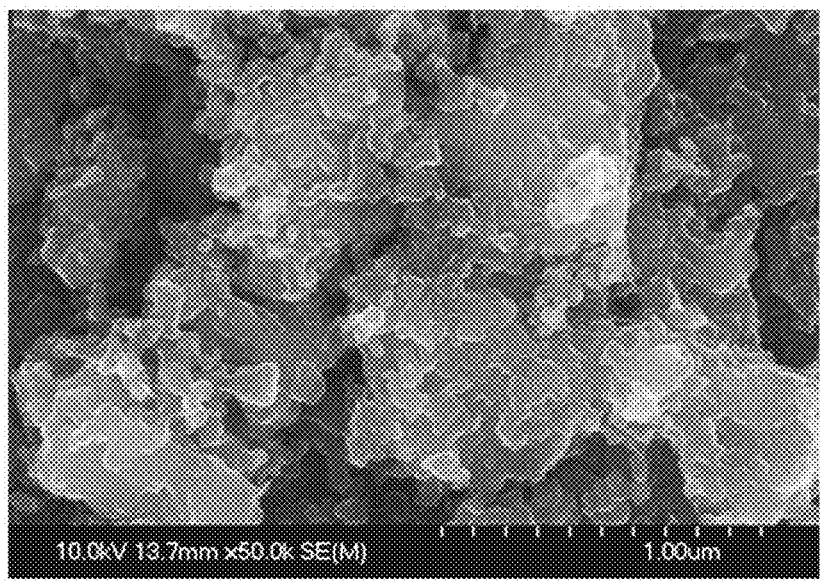
FIG. 16 shows a SEM image at a magnification of 50,000 of a conductive carbon mixture.
Figure 17:
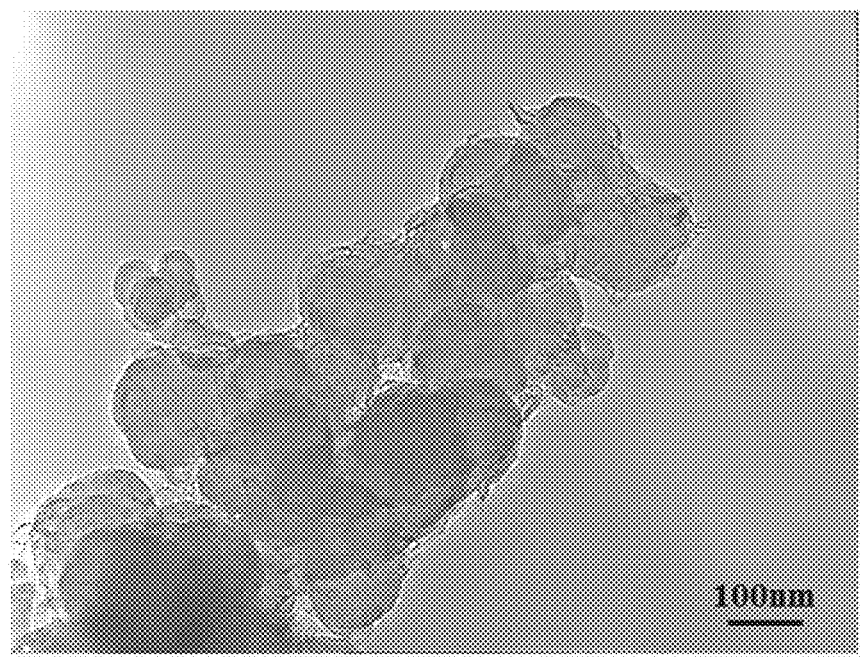
FIG. 17 shows TEM images of a conductive carbon mixture: (A) at a magnification of 100,000 and (B) at a magnification of 500,000.
Figure 17:
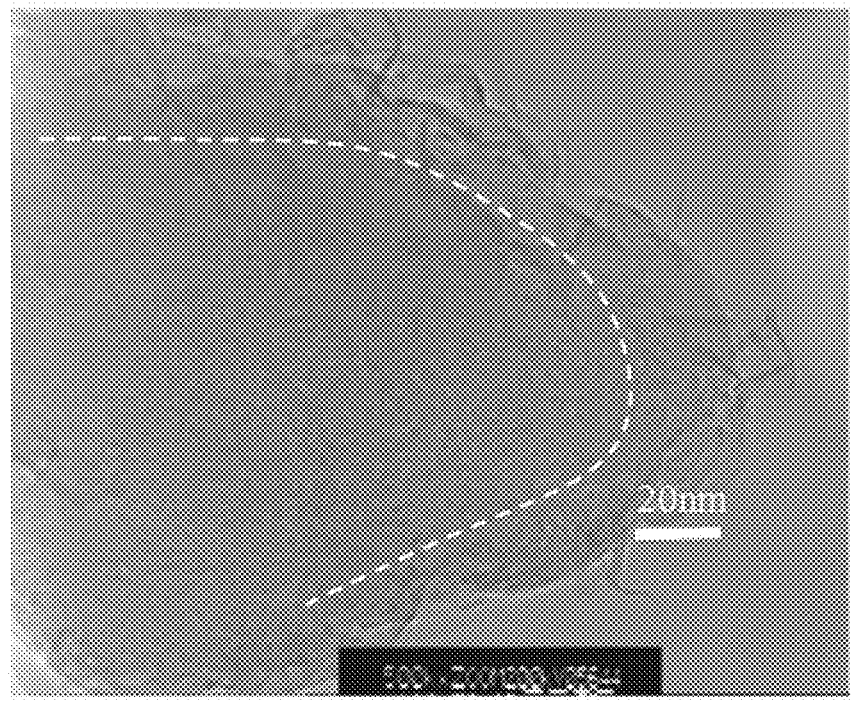

The oxidized carbon obtained in Example 1 and acetylene black (primary particle diameter: 40 nm) were introduced into a ball mill at the mass ratio of 1:1 and dry blended, and a conductive carbon mixture was obtained. FIG. 16 shows a SEM image of the conductive carbon mixture obtained, and FIG. 17 shows TEM images of the conductive carbon mixture obtained. FIG. 16 is an image at a magnification of 50,000, FIG. 17(A) is an image at a magnification of 100,000, and FIG. 17(B) is an image at a magnification of 500,000. It reveals from the SEM image of FIG. 16 the existence of a paste-like carbon on the surface, because the outline of the carbon particles is not clearly shown. Also, the TEM images of FIG. 17 shows that the conductive carbon mixture is composed of a granulated substance and a layered substance on the surface of the granulated substance. The dashed line in FIG. 17(B) shows the surface of the granulated substance. The granulated substance is the particles of acetylene black, and the layered substance is a layer that is formed because the oxidized carbon is collapsed and attached to the surface of the particles of acetylene black. FIG. 17(B) shows that the layered object is composed of a paste-like part in which a non-granulated amorphous carbon is linked, and a fibrous or acicular part.

Then, 4% by mass of the conductive carbon mixture obtained, 2% by mass of polyvinylidene fluoride, and an adequate amount of N-methylpyrrolidone were wet blended, and then 94% by mass of commercially-available $LiNi_{0.5}Mn_{0.3}Co_{0.2}O_2$ particles (average particle diameter: 5 μm) was further added and wet blended, and a slurry was formed. This slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.81 g/cc. Also, by using the positive electrode obtained, a lithium ion secondary battery was produced, in which 1M $LiPF_6$ in a 1:1 ethylene carbonate/diethyl carbonate solution was used as an electrolytic solution, and in which lithium was used as a counter electrode. The discharging curve of the battery obtained was measured within the range of 4.5 to 3.0 V under the condition of 25° C. and the discharging rate of 0.5 C, and the direct current internal resistance (DCIR) was calculated from the voltage drop.

Example 11

4% by mass of the conductive carbon material obtained in Example 10 and 94% by mass of commercially available $LiNi_{0.5}Mn_{0.3}Co_{0.2}O_2$ particles (average particle diameter: 5 μm) were dry blended, and then, 2% by mass of polyvinylidene fluoride and an adequate amount of N-methylpyrrolidone were wet blended and a slurry was formed. This slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.80 g/cc. Further, by using the positive electrode obtained, a lithium ion secondary battery was produced and the DCIR of the battery obtained was calculated in the same procedure as Example 10.

Figure 18:
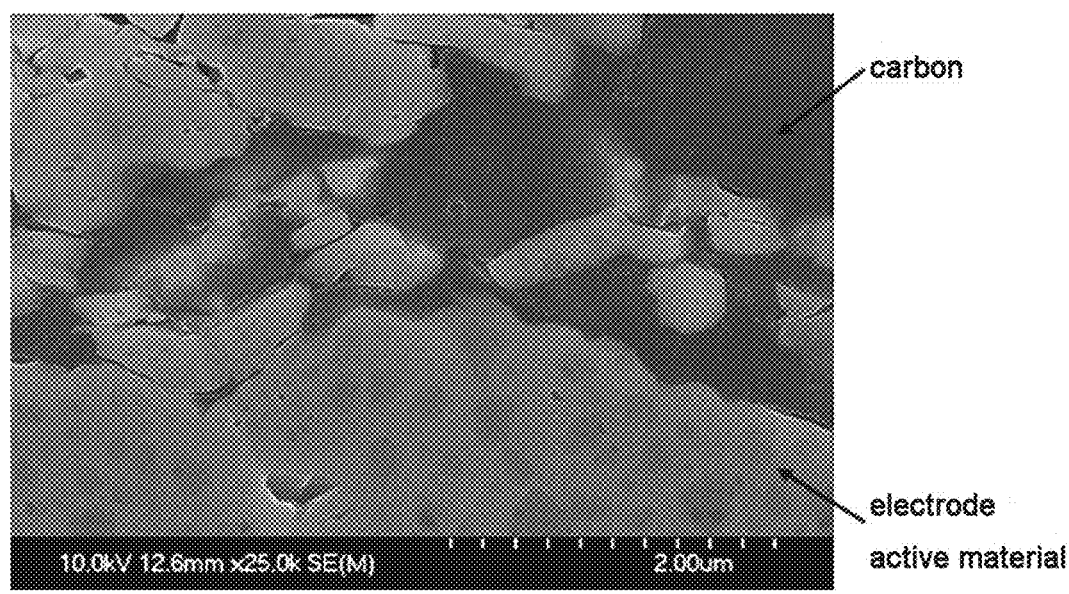
FIG. 18 shows a SEM image at a magnification of 25,000 of the cross-section of the electrode of a working example that is manufactured with a conductive carbon mixture.

The active material layers of the positive electrodes in Example 10 and 11 have the same composition as the active material layer of the positive electrode in Example 5, but the order of blending each component element in the preparation process of the electrode material is different. FIG. 18 shows a SEM image of the cross-section of the positive electrode in Example 10 at a magnification of 25,000. The SEM image in FIG. 18 is similar to the SEM image of the cross-section of the positive electrode in Example 5, which is shown in FIG. 2(B). That is, the grain boundary of the carbon primary particles does not appear, the carbon is paste-like, this paste-like carbon intrudes into the deep parts of the pores having a width of 50 nm or less of the particles of the active material (ie. gaps between the primary particles), and gaps are virtually absent. Also, 90% or more of the surface of the particles of the active material contacts the paste-like carbon. Since fine carbon particles are poorly compatible with a binder and a solvent, when an electrode material in the form of slurry including a binder and a solvent is prepared, it is typical that electrode active material particles and carbon are dry blended, and then a binder and a solvent are added and wet blended. However, the electrode densities of the positive electrodes in Example 10, Example 11 and Example 5 are almost the same and the observation results of the SEM images are similar, therefore it has been found that the conductive carbon mixture is compatible with a binder and a solvent, and leads an electrode that shows a similarly high electrode density even if the conductive carbon mixture is wet blended with active material particles in the presence of a binder and a solvent.

Figure 19:
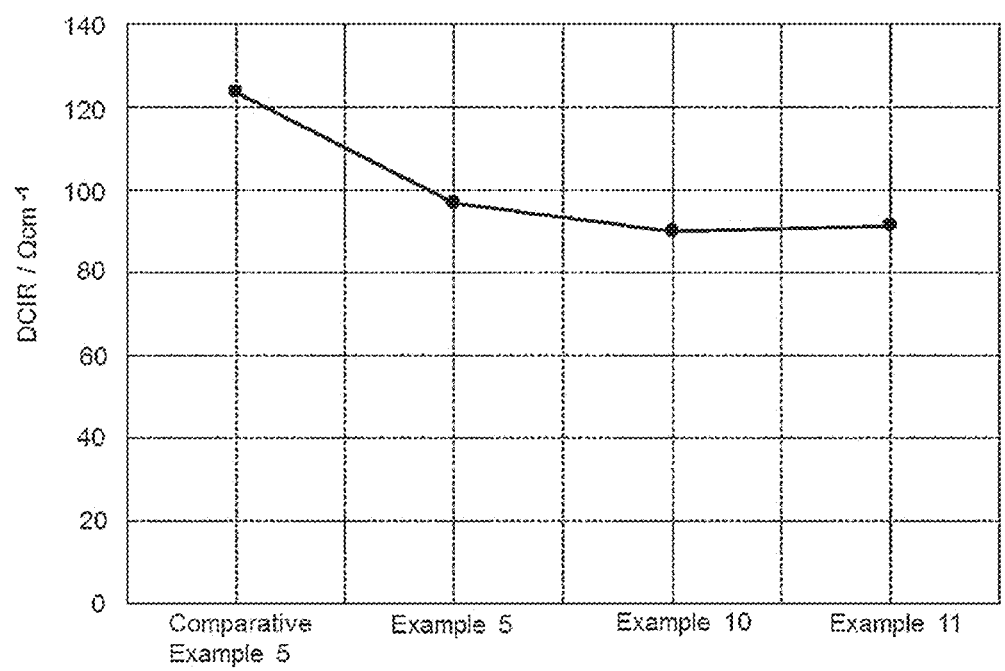
FIG. 19 shows a graph that shows the result of measuring the DC internal resistance of a lithium ion secondary battery in which an electrode of a working example or a comparative example is used.

The DCIRs of the lithium ion secondary battery in Example 5 and the lithium ion secondary battery in Comparative Example 5, which was produced by only using acetylene black as a carbon, were measured in the same procedure as the procedure in Example 10, and were compared with the DCIRs of the lithium ion secondary batteries in Example 10 and Example 11. FIG. 19 shows the result. The DCIR of the lithium ion secondary battery in Example 5 was remarkably lower than the DCR of the lithium ion secondary battery in Comparative Example 5, which fact shows that remarkable decrease in DCIR is achieved by using the electrode of the present invention. Also the DCIRs in the secondary batteries of Example 10 and Example 11 are still lower than the DCIR in the secondary battery of Example 5, which fact shows that the conductive carbon mixture leads to a positive electrode with an excellent conductive property regardless of the blending method of this mixture and electrode active material particles.

(ii) Active Material: $LiCoO_2$

Example 12

4% by mass of the conductive carbon mixture obtained in Example 10, 2% by mass of polyvinylidene fluoride and an adequate amount of N-methylpyrrolidone were wet blended, and then 94% by mass of commercially available $LiCoO_2$ particles (average particle diameter: 10 μm) were further added and wet blended, and a slurry was formed. This slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 4.05 g/cc.

Example 13

4% by mass of the conductive carbon mixture obtained in Example 10 and 94% by mass of commercially available $LiCoO_2$ particles (average particle diameter: 10 μm) were dry blended, and then, 2% by mass of polyvinylidene fluoride and an adequate amount of N-methylpyrrolidone were wet blended and a slurry was formed. This slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 4.05 g/cc.

The active material layers of the positive electrodes in Example 12 and 13 have the same composition as the active material layer of the positive electrode in Example 7, but the order of blending each component element in the preparation process of the electrode material is different. As the electrode densities in the positive electrodes of Example 12, Example 13 and Example 7 are the same, it has been found that the conductive carbon mixture is compatible with a binder and a solvent, and leads an electrode that shows a similarly high electrode density even if the conductive carbon mixture is wet blended with active material particles in the presence of a binder and a solvent.

(iii) Change of Carbon to be Blended with Oxidized Carbon

Example 14

The oxidized carbon obtained in Example 1 and vapor grown carbon fiber (average fiber diameter: 150 nm, average fiber length: 3.9 μm) were introduced into a ball mill at the mass ratio of 1:1 and dry blended, and then a conductive carbon mixture was obtained. Then, 4% by mass of the conductive carbon mixture obtained, 2% by mass of polyvinylidene fluoride and an adequate amount of N-methylpyrrolidone were wet blended, and then 94% by mass of commercially available $LiNi_{0.5}Mn_{0.3}Co_{0.2}O_2$ particles (average particle diameter: 5 μm) were further added and wet blended, and a slurry was formed. This slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.66 g/cc.

Comparative Example 8

4% by mass of the vapor grown carbon fiber used in Example 14, 2% by mass of polyvinylidene fluoride and an adequate amount of N-methylpyrrolidone were wet blended, then 94% by mass of commercially available $LiNi_{0.5}Mn_{0.3}Co_{0.2}O_2$ particles (average particle diameter: 5 μm) were further added and wet blended, and a slurry was formed. This slurry was coated on an aluminum foil, dried and then given a rolling treatment, and a positive electrode with an active material layer for a lithium ion secondary battery was obtained. The electrode density of the positive electrode was calculated from the measured values of the volume and weight of the active material layer on the aluminum foil in the positive electrode. The value of the electrode density was 3.36 g/cc.

Comparison of Example 14 and Comparative Example 8 shows that the electrode density is significantly improved by using the conductive carbon mixture containing the oxidized carbon obtained in Example 1.

Example 15

The procedure of Example 14 was repeated except that graphene (plane direction length: 2 μm, cross direction length: several nm) was used instead of the vapor grown carbon fiber. The value of the electrode density was 3.69 g/cc.

Comparative Example 9

The procedure of Comparative Example 8 was repeated except that the graphene that was used in Example 15 was used instead of the vapor grown carbon fiber. The value of the electrode density was 3.45 g/cc.

Comparison of Example 15 and Comparative Example 9 shows that the electrode density is significantly improved by using the conductive carbon mixture containing the oxidized carbon obtained in Example 1.

Example 16

The procedure of Example 14 was repeated except that furnace black (average particle diameter: 35 nm) was used instead of the vapor grown carbon fiber. The value of the electrode density was 3.76 g/cc.

Comparative Example 10

The procedure of Comparative Example 8 was repeated except that the furnace black that was used in Example 16 was used instead of the vapor grown carbon fiber. The value of the electrode density was 3.42 g/cc.

Comparison of Example 16 and Comparative Example 10 shows that the electrode density is significantly improved by using the conductive carbon mixture containing the oxidized carbon obtained in Example 1.

Example 17

The procedure of Example 14 was repeated except that graphite (average particle diameter: 6 μm) was used instead of the vapor grown carbon fiber. The value of the electrode density was 3.81 g/cc.

Comparative Example 11

The procedure of Comparative Example 8 was repeated except that the graphite that was used in Example 17 was used instead of the vapor grown carbon fiber. The value of the electrode density was 3.48 g/cc.

Comparison of Example 17 and Comparative Example 11 shows that the electrode density is significantly improved by using the conductive carbon mixture containing the oxidized carbon obtained in Example 1.

INDUSTRIAL APPLICABILITY

By using the electrode of the present invention, an electrode device with a high energy density can be obtained.

What is claimed is:

1. A conductive carbon mixture for producing an electrode material for an electric storage device, comprising:
    an oxidized conductive carbon having a hydrophilic part in the amount of 10% by mass or more of the entire oxidized conductive carbon, which is obtained by giving an oxidizing treatment to a carbon raw material with an inner vacancy; and
    a different conductive carbon which is different from the oxidized conductive carbon,
    wherein at least part of the oxidized conductive carbon is deformed into a paste-like state and the deformed oxidized conductive carbon is attached to a surface of the different conductive carbon.

2. The conductive carbon mixture according to claim 1, wherein the oxidized conductive carbon has the hydrophilic part in the amount of 12% by mass or more of the entire oxidized conductive carbon.

3. The conductive carbon mixture according to claim 1, wherein the ratio by mass of the oxidized conductive carbon and the different conductive carbon is within the range of 3:1 to 1:3.

4. A method of producing the conductive carbon mixture according to claim 1, comprising:
    a carbon-oxidizing step of giving an oxidizing treatment to the carbon raw material with an inner vacancy so that the oxidized conductive carbon having the hydrophilic part in the amount of 10% by mass or more of the entire oxidized conductive carbon is obtained by the oxidizing treatment; and
    a combining step of dry blending the oxidized conductive carbon obtained in the carbon-oxidizing step with the different conductive carbon so that at least part of the oxidized conductive carbon is deformed into the paste-like state by a pressure added to the oxidized conductive carbon during the combining step and the deformed oxidized conductive carbon is attached to the surface of the different conductive carbon.

5. The method of producing the conductive carbon mixture according to claim 4, wherein the oxidizing treatment is carried out so that the oxidized conductive carbon has the hydrophilic part in the amount of 12% by mass or more of the entire oxidized conductive carbon in the carbon-oxidizing step.

6. The method of producing the conductive carbon mixture according to claim 4, wherein the ratio by mass of the oxidized conductive carbon and the different conductive carbon is within the range of 3:1 to 1:3.

7. The method of producing the conductive carbon mixture according to claim 4, wherein the carbon raw material is selected from a group consisting of Ketjen Black and furnace black with pores.

8. The method of producing the conductive carbon mixture according to claim 4, wherein the carbon raw material has 300 $m^2/g$ or more of a specific surface area as measured by the BET method.

9. The method of producing the conductive carbon mixture according to claim 4, wherein the different conductive carbon has higher electroconductivity than the deformed oxidized conductive carbon.

10. The method of producing the conductive carbon mixture according to claim 4, wherein the different conductive carbon is acetylene black.

11. A method of producing an electrode material for an electric storage device comprising conductive carbon and particles of an electrode active material, comprising:
    a compounding step of dry blending or wet blending the conductive carbon mixture produced by the method according to claim 4 and the particles of an electrode active material so that the deformed oxidized conductive carbon is also attached to a surface of the particles of an electrode active material.

12. The method of producing an electrode material for an electric storage device according to claim 11, wherein the ratio by mass of the particles of an electrode active material and the conductive carbon mixture is within the range of 95:5 to 99:1.

13. The method of producing an electrode material for an electric storage device according to claim 11, wherein the particles of an electrode active material have an average diameter of more than 2 µm and not more than 25 µm.

14. The method of producing an electrode material for an electric storage device according to claim 11, wherein the electrode material has a form of a slurry in which a binder and a solvent are further comprised, and the compounding step is carried out by a procedure selected from a group consisting of procedures (a), (b), (c) and (d) as mentioned below:
    (a) wet blending the conductive carbon mixture, the particles of an electrode active material, the binder and the solvent to obtain the slurry;
    (b) dry blending the conductive carbon mixture and the particles of an electrode active material to obtain a first mixture, adding the binder and the solvent to the first mixture and wet blending to obtain the slurry;
    (c) wet blending the conductive carbon mixture, the binder and the solvent to obtain a second mixture, adding the particles of an electrode active material to the second mixture and wet blending to obtain the slurry;
    (d) wet blending the conductive carbon mixture, the particle of an electrode active material and the solvent to obtain a third mixture, adding the binder to the third mixture and wet blending to obtain the slurry.

15. The method of producing an electrode material for an electric storage device according to claim 14, wherein the ratio by mass of the particles of an electrode active material and the conductive carbon mixture is within the range of 95:5 to 99:1.

16. The method of producing an electrode material for an electric storage device according to claim 14, wherein the particles of an electrode active material have an average diameter of more than 2 µm and not more than 25 µm.

17. A method of producing an electrode for an electric storage device, comprising:
    a mounting step of forming an active material layer by applying the electrode material produced by the method according to claim 11 on a current collector for the electrode; and
    a pressurizing step of adding pressure to the active material layer obtained in the mounting step so that the oxidized conductive carbon is further deformed into the paste-like state.

18. The method of producing an electrode for an electric storage device according to claim 17, wherein the active material layer obtained in the mounting step is pressurized in the pressurizing step so that the deformed oxidized conductive carbon is pushed out not only into gaps that are formed between the adjacent particles of an electrode active material but also into pores that exist on the surface of the particles of an electrode active material and fills the gaps and the pores while covering the surface of the particles of an electrode active material.

19. A method of producing an electrode for an electric storage device, comprising:
- a mounting step of forming an active material layer by applying the electrode material having a form of a slurry produced by the method according to claim 14 on a current collector for the electrode and then drying the active material layer; and
- a pressurizing step of adding pressure to the active material layer obtained in the mounting step so that the oxidized conductive carbon is further deformed into the paste-like state.

20. The method of producing an electrode for an electric storage device according to claim 19, wherein the active material layer obtained in the mounting step is pressurized in the pressurizing step so that the deformed oxidized conductive carbon is pushed out not only into gaps that are formed between the adjacent particles of an electrode active material but also into pores that exist on the surface of the particles of an electrode active material and fills the gaps and the pores while covering the surface of the particles of an electrode active material.

* * * * *